US012670152B2

(12) United States Patent
Arora et al.

(10) Patent No.: US 12,670,152 B2
(45) Date of Patent: Jun. 30, 2026

(54) READING QUERY RESULTS FROM AN EXTERNAL DATA SYSTEM

(71) Applicant: Cisco Technology, Inc, San Jose, CA (US)

(72) Inventors: Raman Arora, Seattle, WA (US); Ankit Jain, Sunnyvale, CA (US); Meng Su, Sunnyvale, CA (US); Hailun Yan, Sunnyvale, CA (US); Sophia Rui Zhu, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 19/172,354

(22) Filed: Apr. 7, 2025

(65) Prior Publication Data

US 2025/0245219 A1 Jul. 31, 2025

Related U.S. Application Data

(63) Continuation of application No. 17/816,254, filed on Jul. 29, 2022, now Pat. No. 12,271,389.

(Continued)

(51) Int. Cl.
*G06F 16/2452* (2019.01)
*G06F 16/2455* (2019.01)
(Continued)

(52) U.S. Cl.
CPC ...... *G06F 16/2452* (2019.01); *G06F 16/2455* (2019.01); *G06F 16/2477* (2019.01); *G06F 16/248* (2019.01)

(58) Field of Classification Search
CPC ............ G06F 16/2452; G06F 16/2455; G06F 16/2477; G06F 16/248
(Continued)

(56) References Cited

U.S. PATENT DOCUMENTS 5,187,750 A 2/1993 Behera
5,590,321 A 12/1996 Lin et al.
(Continued)

FOREIGN PATENT DOCUMENTS

CN 103729447 A 4/2014
CN 105893205 A 8/2016
(Continued)

OTHER PUBLICATIONS

Alex C., "Google Tests New Site Search Box," Google Operating System, Aug. 28, 2014, 3 Pages.
(Continued)

*Primary Examiner* — Joshua Bullock
(74) *Attorney, Agent, or Firm* — Shook, Hardy & Bacon L.L.P.

(57) ABSTRACT
A computing device can receive a query in a first query language that identifies a set of data to be processed and determine that at least a portion of the set of data resides in an external data system that uses a different query language. The query system can translate the query in the first query language in to a second query language for the external data system. To retrieve results of the translated query, the computing device may determine a quantity of results of generated by the translated query and generate one or more results readers to read the results in parallel. The computing device may further process the results and provide them to a user.

20 Claims, 13 Drawing Sheets

Related U.S. Application Data

(60) Provisional application No. 63/366,229, filed on Jun. 10, 2022.

(51) Int. Cl.
*G06F 16/2458* (2019.01)
*G06F 16/248* (2019.01)

(58) Field of Classification Search
USPC .......................................................... 707/722
See application file for complete search history.

(56) References Cited

U.S. PATENT DOCUMENTS

| | | | |
|---|---|---|---|
| 5,623,652 A | 4/1997 | Vora et al. | |
| 5,812,793 A | 9/1998 | Shakib et al. | |
| 5,913,214 A | 6/1999 | Madnick et al. | |
| 5,918,049 A | 6/1999 | Syvaniemi | |
| 5,941,969 A | 8/1999 | Ram et al. | |
| 6,009,422 A | 12/1999 | Ciccarelli | |
| 6,081,883 A | 6/2000 | Popelka et al. | |
| 6,154,781 A | 11/2000 | Bolam et al. | |
| 6,185,666 B1 | 2/2001 | Murray et al. | |
| 6,205,441 B1 | 3/2001 | Al-Omari et al. | |
| 6,282,537 B1 | 8/2001 | Madnick et al. | |
| 6,408,294 B1 | 6/2002 | Getchius et al. | |
| 6,430,553 B1 | 8/2002 | Ferret | |
| 6,463,454 B1 | 10/2002 | Lumelsky et al. | |
| 6,466,980 B1 | 10/2002 | Lumelsky et al. | |
| 6,473,503 B1 | 10/2002 | Karau et al. | |
| 6,490,585 B1 | 12/2002 | Hanson et al. | |
| 6,502,091 B1 | 12/2002 | Chundi et al. | |
| 6,505,191 B1 | 1/2003 | Baclawski | |
| 6,578,131 B1 | 6/2003 | Larson et al. | |
| 6,707,476 B1 | 3/2004 | Hochstedler | |
| 6,741,982 B2 * | 5/2004 | Soderstrom | G06F 16/252 |
| | | | 707/999.005 |
| 6,786,418 B1 | 9/2004 | Francois | |
| 6,920,396 B1 | 7/2005 | Wallace et al. | |
| 7,007,275 B1 | 2/2006 | Hanson et al. | |
| 7,039,764 B1 | 5/2006 | Shetty et al. | |
| 7,233,939 B1 | 6/2007 | Ziauddin | |
| 7,249,192 B1 | 7/2007 | Brewer et al. | |
| 7,290,196 B1 | 10/2007 | Annayya et al. | |
| 7,370,068 B1 | 5/2008 | Pham et al. | |
| 7,505,985 B2 | 3/2009 | Kilroy | |
| 7,536,686 B2 | 5/2009 | Tan et al. | |
| 7,634,511 B1 | 12/2009 | Freiheit et al. | |
| 7,685,109 B1 | 3/2010 | Ransil et al. | |
| 7,685,281 B1 | 3/2010 | Saraiya et al. | |
| 7,689,553 B2 | 3/2010 | Zuzarte | |
| 7,689,633 B1 | 3/2010 | Li et al. | |
| 7,698,267 B2 | 4/2010 | Papakonstantinou et al. | |
| 7,702,610 B2 | 4/2010 | Zane et al. | |
| 7,769,722 B1 | 8/2010 | Bergant et al. | |
| 7,822,707 B1 | 10/2010 | Yehuda et al. | |
| 7,895,359 B2 | 2/2011 | Reed et al. | |
| 7,937,344 B2 | 5/2011 | Baum et al. | |
| 7,953,730 B1 | 5/2011 | Bleckner et al. | |
| 7,962,464 B1 | 6/2011 | Brette et al. | |
| 8,019,725 B1 | 9/2011 | Mulligan et al. | |
| 8,112,425 B2 | 2/2012 | Baum et al. | |
| 8,166,071 B1 | 4/2012 | Korablev et al. | |
| 8,190,593 B1 | 5/2012 | Dean | |
| 8,195,922 B2 | 6/2012 | Chen et al. | |
| 8,364,460 B2 | 1/2013 | Ostermeyer et al. | |
| 8,412,696 B2 | 4/2013 | Zhang et al. | |
| 8,473,316 B1 | 6/2013 | Panzitta et al. | |
| 8,504,620 B2 | 8/2013 | Chi et al. | |
| 8,527,645 B1 | 9/2013 | Proffit et al. | |
| 8,589,375 B2 | 11/2013 | Zhang et al. | |
| 8,589,403 B2 | 11/2013 | Marquardt et al. | |
| 8,589,432 B2 | 11/2013 | Zhang et al. | |
| 8,601,112 B1 | 12/2013 | Nordstrom et al. | |
| 8,682,925 B1 | 3/2014 | Marquardt et al. | |
| 8,719,520 B1 | 5/2014 | Piszczek et al. | |
| 8,738,587 B1 | 5/2014 | Bitincka et al. | |
| 8,738,629 B1 | 5/2014 | Bitincka et al. | |
| 8,751,529 B2 | 6/2014 | Zhang et al. | |
| 8,761,077 B2 | 6/2014 | Kim et al. | |
| 8,762,367 B2 | 6/2014 | Burger et al. | |
| 8,769,493 B2 | 7/2014 | Arnold et al. | |
| 8,788,525 B2 | 7/2014 | Neels et al. | |
| 8,788,526 B2 | 7/2014 | Neels et al. | |
| 8,793,225 B1 | 7/2014 | Bitincka et al. | |
| 8,806,361 B1 | 8/2014 | Noel et al. | |
| 8,812,490 B1 | 8/2014 | Cappiello et al. | |
| 8,838,678 B1 | 9/2014 | Weiss | |
| 8,849,891 B1 | 9/2014 | Suchter et al. | |
| 8,874,755 B1 | 10/2014 | Deklich et al. | |
| 8,874,961 B2 | 10/2014 | Pillai et al. | |
| 8,924,476 B1 | 12/2014 | Granström et al. | |
| 8,935,257 B1 | 1/2015 | Vemuri et al. | |
| 8,935,302 B2 | 1/2015 | Flynn et al. | |
| 8,943,569 B1 | 1/2015 | Luckett, Jr. et al. | |
| 8,959,221 B2 | 2/2015 | Morgan | |
| 8,983,912 B1 | 3/2015 | Beedgen et al. | |
| 8,983,994 B2 | 3/2015 | Neels et al. | |
| 8,990,148 B1 | 3/2015 | Ziegler et al. | |
| 9,015,197 B2 | 4/2015 | Richards et al. | |
| 9,087,030 B2 | 7/2015 | Basile | |
| 9,087,090 B1 | 7/2015 | Cormier et al. | |
| 9,124,612 B2 | 9/2015 | Vasan et al. | |
| 9,128,636 B2 | 9/2015 | Arakawa | |
| 9,128,980 B2 | 9/2015 | Neels et al. | |
| 9,128,985 B2 | 9/2015 | Marquardt et al. | |
| 9,130,971 B2 | 9/2015 | Vasan et al. | |
| 9,135,560 B1 | 9/2015 | Saurabh et al. | |
| 9,141,665 B1 | 9/2015 | Munro et al. | |
| 9,173,801 B2 | 11/2015 | Merza | |
| 9,185,007 B2 | 11/2015 | Fletcher et al. | |
| 9,215,240 B2 | 12/2015 | Merza et al. | |
| 9,244,999 B2 | 1/2016 | Jin et al. | |
| 9,248,068 B2 | 2/2016 | Merza | |
| 9,256,467 B1 | 2/2016 | Singh et al. | |
| 9,262,519 B1 | 2/2016 | Saurabh et al. | |
| 9,286,413 B1 | 3/2016 | Coates et al. | |
| 9,292,620 B1 | 3/2016 | Hoover et al. | |
| 9,336,327 B2 * | 5/2016 | Melnik | G06F 16/258 |
| 9,342,571 B1 | 5/2016 | Kurtic et al. | |
| 9,378,088 B1 | 6/2016 | Piszczek et al. | |
| 9,426,045 B2 | 8/2016 | Fletcher et al. | |
| 9,426,172 B2 | 8/2016 | Merza | |
| 9,432,396 B2 | 8/2016 | Merza | |
| 9,438,470 B2 | 9/2016 | Brady, Jr. et al. | |
| 9,438,515 B2 | 9/2016 | McCormick et al. | |
| 9,489,385 B1 | 11/2016 | Ladola | |
| 9,495,427 B2 | 11/2016 | Abadi et al. | |
| 9,514,146 B1 | 12/2016 | Wallace et al. | |
| 9,514,189 B2 | 12/2016 | Bitincka et al. | |
| 9,558,194 B1 | 1/2017 | Srivastav et al. | |
| 9,576,007 B1 | 2/2017 | Sivathanu et al. | |
| 9,576,046 B2 | 2/2017 | Bullotta et al. | |
| 9,589,012 B2 | 3/2017 | Neels et al. | |
| 9,619,581 B2 | 4/2017 | Hughes et al. | |
| 9,621,636 B1 | 4/2017 | McVeety et al. | |
| 9,641,334 B2 | 5/2017 | Faitelson et al. | |
| 9,667,676 B1 | 5/2017 | Lo et al. | |
| 9,672,116 B1 | 6/2017 | Chopra et al. | |
| 9,672,274 B1 | 6/2017 | Goo | |
| 9,690,858 B1 | 6/2017 | Diliberto et al. | |
| 9,722,951 B2 | 8/2017 | Almadi | |
| 9,734,180 B1 | 8/2017 | Graham et al. | |
| 9,753,935 B1 | 9/2017 | Tobin et al. | |
| 9,779,015 B1 | 10/2017 | Oikarinen et al. | |
| 9,806,978 B2 | 10/2017 | McAlister et al. | |
| 9,838,292 B2 | 12/2017 | Polychronis | |
| 9,900,397 B1 | 2/2018 | Cope et al. | |
| 9,916,367 B2 | 3/2018 | Lin et al. | |
| 9,959,062 B1 | 5/2018 | Piszczek et al. | |
| 9,984,128 B2 | 5/2018 | Vasan et al. | |
| 9,990,386 B2 | 6/2018 | Marquardt et al. | |
| 9,992,741 B2 | 6/2018 | Trainin et al. | |
| 9,996,400 B2 | 6/2018 | Nakagawa | |

(56) References Cited

U.S. PATENT DOCUMENTS

| | | | |
|---|---|---|---|
| 10,025,795 B2 | 7/2018 | Fokoue-Nkoutche et al. |
| 10,031,922 B2 | 7/2018 | Fokoue-Nkoutche et al. |
| 10,037,341 B1 | 7/2018 | Bassov et al. |
| 10,049,160 B2 | 8/2018 | Bitincka et al. |
| 10,091,100 B1 | 10/2018 | Duerk |
| 10,095,993 B1 | 10/2018 | Bar-Menachem et al. |
| 10,120,898 B1 | 11/2018 | Betawadkar-Norwood et al. |
| 10,120,914 B2 | 11/2018 | Vogt |
| 10,127,258 B2 | 11/2018 | Lamas et al. |
| 10,142,204 B2 | 11/2018 | Nickolov et al. |
| 10,169,465 B2 | 1/2019 | Andrews et al. |
| 10,216,774 B2 | 2/2019 | Dang et al. |
| 10,318,491 B1 | 6/2019 | Graham et al. |
| 10,318,511 B2 | 6/2019 | De Smet et al. |
| 10,320,638 B1 | 6/2019 | Lauinger et al. |
| 10,353,965 B2 | 7/2019 | Pal et al. |
| 10,409,440 B2 | 9/2019 | Blinn et al. |
| 10,437,653 B2 | 10/2019 | Cyr et al. |
| 10,445,311 B1 | 10/2019 | Saurabh et al. |
| 10,452,632 B1 | 10/2019 | Simmen et al. |
| 10,452,650 B1 | 10/2019 | Monaharan et al. |
| 10,474,723 B2 | 11/2019 | Hodge et al. |
| 10,509,794 B2 | 12/2019 | Filippi et al. |
| 10,528,599 B1 | 1/2020 | Pandis et al. |
| 10,534,794 B2 | 1/2020 | Dageville et al. |
| 10,558,656 B2 | 2/2020 | Wells et al. |
| 10,585,951 B2 | 3/2020 | Bhattacharjee et al. |
| 10,592,561 B2 | 3/2020 | Bhattacharjee et al. |
| 10,592,562 B2 | 3/2020 | Pal et al. |
| 10,592,563 B2 | 3/2020 | Pal et al. |
| 10,599,662 B2 | 3/2020 | Costantino et al. |
| 10,599,723 B2 | 3/2020 | Bhattacharjee et al. |
| 10,599,724 B2 | 3/2020 | Pal et al. |
| 10,606,856 B2 | 3/2020 | Bath et al. |
| 10,657,061 B1 | 5/2020 | Marriner |
| 10,657,146 B2 | 5/2020 | Bath et al. |
| 10,706,056 B1 * | 7/2020 | Lin ..................... H04L 63/1425 |
| 10,726,009 B2 | 7/2020 | Pal et al. |
| 10,769,148 B1 | 9/2020 | Binkert et al. |
| 10,776,355 B1 | 9/2020 | Batsakis et al. |
| 10,776,366 B1 | 9/2020 | Astretsov et al. |
| 10,776,374 B2 | 9/2020 | Valine et al. |
| 10,795,884 B2 | 10/2020 | Bhattacharjee et al. |
| 10,871,878 B1 | 12/2020 | Mody et al. |
| 10,896,182 B2 | 1/2021 | Bhattacharjee et al. |
| 10,909,130 B1 | 2/2021 | Scott et al. |
| 10,929,415 B1 | 2/2021 | Shcherbakov et al. |
| 10,936,585 B1 | 3/2021 | Echeverria et al. |
| 10,956,415 B2 | 3/2021 | Pal et al. |
| 10,977,260 B2 | 4/2021 | Pal et al. |
| 10,984,044 B1 | 4/2021 | Batsakis et al. |
| 10,999,164 B1 | 5/2021 | Sridhar et al. |
| 11,003,714 B1 | 5/2021 | Batsakis et al. |
| 11,010,435 B2 | 5/2021 | Pal et al. |
| 11,023,463 B2 | 6/2021 | Pal et al. |
| 11,023,539 B2 | 6/2021 | Pal et al. |
| 11,080,345 B2 | 8/2021 | Pal et al. |
| 11,100,106 B1 * | 8/2021 | Sainanee ............. G06F 16/2453 |
| 11,106,734 B1 | 8/2021 | Batsakis et al. |
| 11,113,274 B1 | 9/2021 | Thiel et al. |
| 11,113,294 B1 | 9/2021 | Bourbie et al. |
| 11,120,087 B2 | 9/2021 | Dhillon et al. |
| 11,126,632 B2 | 9/2021 | Pal et al. |
| 11,151,137 B2 | 10/2021 | Bhattacharjee et al. |
| 11,163,758 B2 | 11/2021 | James et al. |
| 11,176,208 B2 | 11/2021 | Pal et al. |
| 11,216,511 B1 | 1/2022 | Bigdelu et al. |
| 11,222,066 B1 | 1/2022 | Batsakis et al. |
| 11,232,100 B2 | 1/2022 | Bhattacharjee et al. |
| 11,238,112 B2 | 2/2022 | Hodge et al. |
| 11,243,963 B2 | 2/2022 | Pal et al. |
| 11,250,056 B1 | 2/2022 | Batsakis et al. |
| 11,263,268 B1 | 3/2022 | Bourbie et al. |
| 11,269,871 B1 | 3/2022 | Bigdelu et al. |
| 11,269,939 B1 | 3/2022 | Sammer et al. |
| 11,281,706 B2 | 3/2022 | Pal et al. |
| 11,294,941 B1 | 4/2022 | Sammer et al. |
| 11,314,753 B2 | 4/2022 | Pal et al. |
| 11,321,321 B2 | 5/2022 | Bhattacharjee et al. |
| 11,334,543 B1 | 5/2022 | Anwar et al. |
| 11,341,131 B2 | 5/2022 | Pal et al. |
| 11,386,158 B2 | 7/2022 | Bourbie et al. |
| 11,392,654 B2 | 7/2022 | Pal et al. |
| 11,409,756 B1 | 8/2022 | Park et al. |
| 11,416,528 B2 | 8/2022 | Pal et al. |
| 11,442,935 B2 | 9/2022 | Pal et al. |
| 11,461,334 B2 | 10/2022 | Bhattacharjee et al. |
| 11,494,380 B2 | 11/2022 | Rao et al. |
| 11,500,875 B2 | 11/2022 | Bhattacharjee et al. |
| 11,500,952 B1 | 11/2022 | Gupta et al. |
| 11,537,311 B1 | 12/2022 | Dhupelia et al. |
| 11,537,627 B1 | 12/2022 | Baskaran et al. |
| 11,550,847 B1 | 1/2023 | Batsakis et al. |
| 11,562,023 B1 | 1/2023 | Batsakis et al. |
| 11,567,993 B1 | 1/2023 | Batsakis et al. |
| 11,580,107 B2 | 2/2023 | Pal et al. |
| 11,586,627 B2 | 2/2023 | Bhattacharjee et al. |
| 11,586,692 B2 | 2/2023 | Bhattacharjee et al. |
| 11,593,377 B2 | 2/2023 | Bhattacharjee et al. |
| 11,599,541 B2 | 3/2023 | Pal et al. |
| 11,604,789 B1 | 3/2023 | Cannon et al. |
| 11,604,795 B2 | 3/2023 | Pal et al. |
| 11,604,799 B1 | 3/2023 | Bigdelu et al. |
| 11,615,087 B2 | 3/2023 | Pal et al. |
| 11,615,104 B2 | 3/2023 | Pal et al. |
| 11,620,300 B2 | 4/2023 | Burnett et al. |
| 11,620,303 B1 | 4/2023 | Roy et al. |
| 11,620,336 B1 | 4/2023 | Batsakis et al. |
| 11,636,105 B2 | 4/2023 | Pal et al. |
| 11,636,128 B1 | 4/2023 | Bigdelu et al. |
| 11,644,955 B1 | 5/2023 | Singamneni et al. |
| 11,663,227 B2 | 5/2023 | Pal et al. |
| 11,676,345 B1 | 6/2023 | Bhushan et al. |
| 11,695,643 B1 | 7/2023 | Cawley et al. |
| 11,704,313 B1 | 7/2023 | Andrade et al. |
| 11,720,537 B2 | 8/2023 | Anwar et al. |
| 11,727,016 B1 | 8/2023 | Agarwal et al. |
| 11,743,285 B2 | 8/2023 | Luger |
| 11,797,618 B2 | 10/2023 | Pal et al. |
| 11,860,874 B2 | 1/2024 | Bhattacharjee et al. |
| 11,860,940 B1 | 1/2024 | Batsakis et al. |
| 11,874,691 B1 | 1/2024 | Batsakis et al. |
| 11,886,455 B1 | 1/2024 | Baskaran et al. |
| 11,899,670 B1 | 2/2024 | Bhagat et al. |
| 11,921,672 B2 | 3/2024 | Pal et al. |
| 11,922,222 B1 | 3/2024 | Chawla et al. |
| 11,947,528 B1 | 4/2024 | Bhagat et al. |
| 11,947,988 B1 | 4/2024 | Kulkarni et al. |
| 11,966,391 B2 | 4/2024 | Pal et al. |
| 11,989,194 B2 | 5/2024 | Bhattacharjee et al. |
| 11,995,079 B2 | 5/2024 | Pal et al. |
| 12,007,996 B2 | 6/2024 | Rao et al. |
| 12,013,895 B2 | 6/2024 | Batsakis et al. |
| 12,026,155 B2 | 7/2024 | Bigdelu et al. |
| 12,067,008 B1 | 8/2024 | Bigdelu et al. |
| 12,072,939 B1 | 8/2024 | Batsakis et al. |
| 12,079,210 B2 * | 9/2024 | Benda ................ G06F 16/2448 |
| 12,093,272 B1 | 9/2024 | Batsakis et al. |
| 12,093,318 B2 | 9/2024 | Bourbie et al. |
| 12,118,009 B2 | 10/2024 | Bhattacharjee et al. |
| 12,130,829 B2 | 10/2024 | Bigdelu et al. |
| 12,141,137 B1 | 11/2024 | Arora et al. |
| 12,141,183 B2 | 11/2024 | Pal et al. |
| 2001/0016821 A1 | 8/2001 | DeBusk et al. |
| 2001/0055017 A1 | 12/2001 | Ording |
| 2002/0070968 A1 | 6/2002 | Austin et al. |
| 2002/0112123 A1 | 8/2002 | Becker et al. |
| 2002/0138471 A1 | 9/2002 | Dutta et al. |
| 2002/0152299 A1 | 10/2002 | Traversat et al. |
| 2002/0169764 A1 | 11/2002 | Kincaid et al. |
| 2002/0198869 A1 | 12/2002 | Barnett |
| 2003/0014403 A1 | 1/2003 | Chandrasekar et al. |
| 2003/0058280 A1 | 3/2003 | Molinari et al. |
| 2003/0066033 A1 | 4/2003 | Direen et al. |

(56) References Cited

U.S. PATENT DOCUMENTS

| | | |
|---|---|---|
| 2003/0106015 A1 | 6/2003 | Chu et al. |
| 2003/0120682 A1 | 6/2003 | Bestgen et al. |
| 2003/0120723 A1 | 6/2003 | Bright et al. |
| 2003/0130993 A1 | 7/2003 | Mendelevitch et al. |
| 2003/0154238 A1 | 8/2003 | Murphy et al. |
| 2003/0167270 A1 | 9/2003 | Werme et al. |
| 2003/0188198 A1 | 10/2003 | Holdsworth et al. |
| 2003/0229620 A1 | 12/2003 | Carlson et al. |
| 2004/0030682 A1 | 2/2004 | Porter et al. |
| 2004/0117345 A1 | 6/2004 | Bamford et al. |
| 2004/0122845 A1 | 6/2004 | Lohman et al. |
| 2004/0143604 A1 | 7/2004 | Glenner et al. |
| 2004/0230571 A1 | 11/2004 | Robertson |
| 2005/0004911 A1 | 1/2005 | Goldberg et al. |
| 2005/0015361 A1 | 1/2005 | Payton et al. |
| 2005/0015368 A1 | 1/2005 | Payton et al. |
| 2005/0022047 A1 | 1/2005 | Chandrasekaran |
| 2005/0022207 A1 | 1/2005 | Grabarnik et al. |
| 2005/0027796 A1 | 2/2005 | San Andres et al. |
| 2005/0066027 A1 | 3/2005 | Hakiel et al. |
| 2005/0076305 A1 | 4/2005 | Hintermeister et al. |
| 2005/0102325 A1 | 5/2005 | Gould et al. |
| 2005/0192937 A1 | 9/2005 | Barsness et al. |
| 2005/0228788 A1 | 10/2005 | Dahn et al. |
| 2005/0289232 A1 | 12/2005 | Ebert |
| 2006/0004693 A1 | 1/2006 | Ramanathan et al. |
| 2006/0004707 A1 | 1/2006 | Dettinger et al. |
| 2006/0026211 A1 | 2/2006 | Potteiger |
| 2006/0064674 A1 | 3/2006 | Olson et al. |
| 2006/0074916 A1 | 4/2006 | Beary |
| 2006/0155720 A1 | 7/2006 | Feinberg |
| 2006/0161560 A1 | 7/2006 | Khandelwal et al. |
| 2006/0173993 A1 | 8/2006 | Henseler et al. |
| 2006/0184998 A1 | 8/2006 | Smith et al. |
| 2006/0212607 A1 | 9/2006 | Riethmuller |
| 2006/0218479 A1 | 9/2006 | Torres |
| 2006/0224587 A1 | 10/2006 | Zamir et al. |
| 2006/0224603 A1 | 10/2006 | Correll |
| 2006/0248045 A1 | 11/2006 | Toledano et al. |
| 2006/0259460 A1 | 11/2006 | Zurek et al. |
| 2006/0271504 A1 | 11/2006 | Anderson et al. |
| 2007/0022125 A1 | 1/2007 | Salam et al. |
| 2007/0033155 A1 | 2/2007 | Landsman |
| 2007/0043702 A1 | 2/2007 | Lakshminarayanan et al. |
| 2007/0050328 A1 | 3/2007 | Li et al. |
| 2007/0088723 A1 | 4/2007 | Fish |
| 2007/0100873 A1 | 5/2007 | Yako et al. |
| 2007/0118491 A1 | 5/2007 | Baum et al. |
| 2007/0136311 A1 | 6/2007 | Kasten et al. |
| 2007/0143261 A1 | 6/2007 | Uppala |
| 2007/0156842 A1 | 7/2007 | Vermeulen et al. |
| 2007/0168336 A1 | 7/2007 | Ransil et al. |
| 2007/0168656 A1 | 7/2007 | Paganetti et al. |
| 2007/0174188 A1 | 7/2007 | Fish |
| 2007/0198641 A1 | 8/2007 | Dorai et al. |
| 2007/0208669 A1 | 9/2007 | Rivette et al. |
| 2007/0233672 A1 | 10/2007 | Sanfacon et al. |
| 2007/0282797 A1 | 12/2007 | Wang et al. |
| 2007/0283194 A1 | 12/2007 | Villella et al. |
| 2008/0010337 A1 | 1/2008 | Hayes et al. |
| 2008/0025616 A1 | 1/2008 | Bryll |
| 2008/0033927 A1 | 2/2008 | Richards et al. |
| 2008/0065591 A1 | 3/2008 | Guzenda |
| 2008/0071755 A1 | 3/2008 | Barsness et al. |
| 2008/0114730 A1 | 5/2008 | Larimore et al. |
| 2008/0133235 A1 | 6/2008 | Simoneau et al. |
| 2008/0162592 A1 | 7/2008 | Huang et al. |
| 2008/0172357 A1 | 7/2008 | Rechis et al. |
| 2008/0192280 A1 | 8/2008 | Masuyama |
| 2008/0195649 A1 | 8/2008 | Lefebvre |
| 2008/0208844 A1 | 8/2008 | Jenkins |
| 2008/0215546 A1 | 9/2008 | Baum et al. |
| 2008/0243784 A1 | 10/2008 | Stading |
| 2008/0243807 A1 | 10/2008 | Gaucas et al. |
| 2008/0275857 A1 | 11/2008 | Dettinger et al. |
| 2008/0294660 A1 | 11/2008 | Patterson et al. |
| 2008/0300835 A1 | 12/2008 | Hixon |
| 2009/0006148 A1 | 1/2009 | Bacalski et al. |
| 2009/0006527 A1 | 1/2009 | Gingell, Jr. et al. |
| 2009/0007125 A1 | 1/2009 | Barsness et al. |
| 2009/0019020 A1 | 1/2009 | Dhillon et al. |
| 2009/0125526 A1 | 5/2009 | Neufeld |
| 2009/0129163 A1 | 5/2009 | Danilak |
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0228464 A1 | 9/2009 | Jones et al. |
| 2009/0234799 A1 | 9/2009 | Betawadkar-Norwood et al. |
| 2009/0248764 A1 | 10/2009 | Day et al. |
| 2009/0276421 A1 | 11/2009 | Qiu |
| 2009/0284530 A1 | 11/2009 | Lester et al. |
| 2009/0292810 A1 | 11/2009 | Hotta et al. |
| 2009/0319518 A1 | 12/2009 | Koudas et al. |
| 2009/0327240 A1 | 12/2009 | Meehan et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0049692 A1 | 2/2010 | Astito et al. |
| 2010/0106934 A1 | 4/2010 | Calder et al. |
| 2010/0125565 A1 | 5/2010 | Burger et al. |
| 2010/0135582 A1 | 6/2010 | Gokturk et al. |
| 2010/0153285 A1 | 6/2010 | Anderson et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2010/0299458 A1 | 11/2010 | Marking et al. |
| 2010/0306590 A1 | 12/2010 | Anand et al. |
| 2010/0332461 A1 | 12/2010 | Friedman et al. |
| 2011/0047169 A1 | 2/2011 | Leighton et al. |
| 2011/0055231 A1 | 3/2011 | Huck et al. |
| 2011/0060887 A1 | 3/2011 | Thatcher et al. |
| 2011/0066629 A1 | 3/2011 | Escalante et al. |
| 2011/0078055 A1 | 3/2011 | Faribault et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0126232 A1 | 5/2011 | Lee et al. |
| 2011/0131200 A1 | 6/2011 | Zhou et al. |
| 2011/0173184 A1 | 7/2011 | Kelshikar et al. |
| 2011/0179024 A1 | 7/2011 | Stiver et al. |
| 2011/0191373 A1 | 8/2011 | Botros et al. |
| 2011/0196804 A1 | 8/2011 | Sutter et al. |
| 2011/0213765 A1 | 9/2011 | Cui et al. |
| 2011/0213778 A1 | 9/2011 | Hess et al. |
| 2011/0213870 A1 | 9/2011 | Cai et al. |
| 2011/0225192 A1 | 9/2011 | Imig et al. |
| 2011/0231858 A1 | 9/2011 | Sampathkumar et al. |
| 2011/0246294 A1 | 10/2011 | Robb et al. |
| 2011/0289163 A1 | 11/2011 | Edwards et al. |
| 2011/0295838 A1* | 12/2011 | Collins .............. G06F 16/2264 707/715 |
| 2011/0295968 A1 | 12/2011 | Takaoka et al. |
| 2011/0320550 A1 | 12/2011 | Lawson et al. |
| 2012/0005044 A1 | 1/2012 | Coleman |
| 2012/0005308 A1 | 1/2012 | Cok |
| 2012/0023429 A1 | 1/2012 | Medhi |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0078975 A1 | 3/2012 | Chen et al. |
| 2012/0079004 A1 | 3/2012 | Herman |
| 2012/0102024 A1 | 4/2012 | Campbell et al. |
| 2012/0110474 A1 | 5/2012 | Chen et al. |
| 2012/0130986 A1 | 5/2012 | Abdellatif et al. |
| 2012/0130988 A1 | 5/2012 | Nica et al. |
| 2012/0130997 A1 | 5/2012 | Risvik et al. |

(56) References Cited

U.S. PATENT DOCUMENTS

| | | |
|---|---|---|
| 2012/0143873 A1 | 6/2012 | Saadat |
| 2012/0150819 A1 | 6/2012 | Lindahl et al. |
| 2012/0166440 A1 | 6/2012 | Shmueli et al. |
| 2012/0173728 A1 | 7/2012 | Haskins et al. |
| 2012/0197856 A1 | 8/2012 | Banka et al. |
| 2012/0197934 A1 | 8/2012 | Zhang et al. |
| 2012/0221553 A1 | 8/2012 | Wittmer et al. |
| 2012/0226712 A1 | 9/2012 | Vermeulen et al. |
| 2012/0246165 A1 | 9/2012 | Batraski et al. |
| 2012/0246173 A1 | 9/2012 | Wittmer et al. |
| 2012/0254269 A1 | 10/2012 | Carmichael |
| 2012/0254805 A1 | 10/2012 | Pic et al. |
| 2012/0271741 A1 | 10/2012 | Leonard |
| 2012/0278346 A1 | 11/2012 | Han et al. |
| 2012/0284713 A1 | 11/2012 | Ostermeyer et al. |
| 2012/0310916 A1 | 12/2012 | Abadi et al. |
| 2012/0331010 A1 | 12/2012 | Christie |
| 2013/0018868 A1 | 1/2013 | Chi et al. |
| 2013/0054649 A1 | 2/2013 | Potapov et al. |
| 2013/0060783 A1 | 3/2013 | Baum et al. |
| 2013/0066674 A1 | 3/2013 | Vasters |
| 2013/0067564 A1 | 3/2013 | Fok Ah Chuen et al. |
| 2013/0073542 A1 | 3/2013 | Zhang et al. |
| 2013/0080460 A1 | 3/2013 | Tomko et al. |
| 2013/0084826 A1 | 4/2013 | Mo et al. |
| 2013/0086040 A1 | 4/2013 | Patadia et al. |
| 2013/0086107 A1 | 4/2013 | Genochio et al. |
| 2013/0091119 A1 | 4/2013 | Huang et al. |
| 2013/0097139 A1 | 4/2013 | Thoresen et al. |
| 2013/0110828 A1 | 5/2013 | Meyerzon et al. |
| 2013/0124542 A1 | 5/2013 | Lee et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0159324 A1 | 6/2013 | Xu et al. |
| 2013/0159832 A1 | 6/2013 | Ingargiola et al. |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |
| 2013/0226971 A1 | 8/2013 | Shoolman et al. |
| 2013/0232187 A1 | 9/2013 | Workman et al. |
| 2013/0238663 A1 | 9/2013 | Mead et al. |
| 2013/0238706 A1 | 9/2013 | Desai |
| 2013/0238747 A1 | 9/2013 | Albouze et al. |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0290291 A1 | 10/2013 | Loofbourrow et al. |
| 2013/0304760 A1 | 11/2013 | Torii |
| 2013/0311488 A1 | 11/2013 | Erdogan et al. |
| 2013/0311659 A1* | 11/2013 | Curran ............... G06F 3/067 709/225 |
| 2013/0318236 A1 | 11/2013 | Coates et al. |
| 2013/0318536 A1 | 11/2013 | Fletcher et al. |
| 2013/0325850 A1 | 12/2013 | Redmond et al. |
| 2013/0326620 A1 | 12/2013 | Merza et al. |
| 2013/0339298 A1 | 12/2013 | Muller et al. |
| 2013/0339567 A1 | 12/2013 | Carpentier et al. |
| 2014/0019909 A1 | 1/2014 | Leonard et al. |
| 2014/0052733 A1 | 2/2014 | Blank, Jr. et al. |
| 2014/0067759 A1 | 3/2014 | Aguilera et al. |
| 2014/0067792 A1 | 3/2014 | Erdogan et al. |
| 2014/0068343 A1 | 3/2014 | Nakajima et al. |
| 2014/0074810 A1 | 3/2014 | Wang |
| 2014/0074887 A1 | 3/2014 | Neels et al. |
| 2014/0082013 A1 | 3/2014 | Wolf et al. |
| 2014/0089511 A1 | 3/2014 | McLean |
| 2014/0095470 A1 | 4/2014 | Chen et al. |
| 2014/0122117 A1 | 5/2014 | Masarie, Jr. et al. |
| 2014/0129515 A1 | 5/2014 | Venkatesan et al. |
| 2014/0149355 A1 | 5/2014 | Gupta et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188862 A1 | 7/2014 | Campbell et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0214811 A1 | 7/2014 | Aramaki |
| 2014/0214976 A1 | 7/2014 | Zhou et al. |
| 2014/0222798 A1 | 8/2014 | Want et al. |
| 2014/0236889 A1 | 8/2014 | Vasan et al. |
| 2014/0236890 A1 | 8/2014 | Vasan et al. |
| 2014/0244585 A1 | 8/2014 | Sivasubramanian et al. |
| 2014/0258295 A1 | 9/2014 | Wang et al. |
| 2014/0278652 A1 | 9/2014 | Joyner et al. |
| 2014/0280021 A1 | 9/2014 | Singamshetty |
| 2014/0281868 A1 | 9/2014 | Vogel et al. |
| 2014/0289414 A1 | 9/2014 | Chan et al. |
| 2014/0317084 A1 | 10/2014 | Chaudhry et al. |
| 2014/0324825 A1 | 10/2014 | Gopinath et al. |
| 2014/0324862 A1 | 10/2014 | Bingham et al. |
| 2014/0344304 A1 | 11/2014 | Topatan et al. |
| 2014/0359598 A1 | 12/2014 | Oliver et al. |
| 2014/0379691 A1 | 12/2014 | Teletia et al. |
| 2014/0380322 A1 | 12/2014 | Ailamaki et al. |
| 2015/0019537 A1 | 1/2015 | Robichaud et al. |
| 2015/0039641 A1 | 2/2015 | Neeman et al. |
| 2015/0039650 A1 | 2/2015 | Andrews et al. |
| 2015/0039757 A1 | 2/2015 | Petersen et al. |
| 2015/0049163 A1 | 2/2015 | Smurro |
| 2015/0052125 A1 | 2/2015 | Ellis et al. |
| 2015/0058293 A1 | 2/2015 | Kobayashi et al. |
| 2015/0074819 A1 | 3/2015 | Borenstein |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0120745 A1 | 4/2015 | James |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki et al. |
| 2015/0149509 A1 | 5/2015 | Leu et al. |
| 2015/0149879 A1 | 5/2015 | Miller et al. |
| 2015/0161211 A1 | 6/2015 | Patel et al. |
| 2015/0161237 A1 | 6/2015 | Agarwal et al. |
| 2015/0161239 A1 | 6/2015 | Stepinski et al. |
| 2015/0169684 A1 | 6/2015 | Li et al. |
| 2015/0169686 A1 | 6/2015 | Eliás et al. |
| 2015/0169786 A1 | 6/2015 | Jerzak et al. |
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0212663 A1 | 7/2015 | Papale et al. |
| 2015/0213127 A1 | 7/2015 | Chang et al. |
| 2015/0213631 A1 | 7/2015 | Vander Broek |
| 2015/0220601 A1 | 8/2015 | Leyba |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0254369 A1 | 9/2015 | Hou et al. |
| 2015/0295796 A1 | 10/2015 | Hsiao et al. |
| 2015/0295848 A1 | 10/2015 | Vlachogiannis et al. |
| 2015/0302051 A1 | 10/2015 | Baumgartner et al. |
| 2015/0304879 A1 | 10/2015 | Dacosta |
| 2015/0309689 A1 | 10/2015 | Jin et al. |
| 2015/0319256 A1 | 11/2015 | Casey |
| 2015/0324433 A1 | 11/2015 | Duffy et al. |
| 2015/0339312 A1 | 11/2015 | Lin et al. |

(56)                    References Cited

U.S. PATENT DOCUMENTS

| | | |
|---|---|---|
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0381725 A1 | 12/2015 | Haapaoja et al. |
| 2016/0004736 A1 | 1/2016 | Tsuchida et al. |
| 2016/0004741 A1 | 1/2016 | Johnson et al. |
| 2016/0012045 A1 | 1/2016 | Franceschini et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | Mcdaid et al. |
| 2016/0055184 A1 | 2/2016 | Fokoue-Nkoutche et al. |
| 2016/0062555 A1 | 3/2016 | Ward et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085785 A1 | 3/2016 | Hoffmann |
| 2016/0085810 A1 | 3/2016 | De Castro Alves et al. |
| 2016/0087880 A1 | 3/2016 | Shalita et al. |
| 2016/0092204 A1 | 3/2016 | Katkere et al. |
| 2016/0092485 A1 | 3/2016 | Lamas et al. |
| 2016/0092493 A1 | 3/2016 | Ko et al. |
| 2016/0092541 A1 | 3/2016 | Liu et al. |
| 2016/0092558 A1 | 3/2016 | Ago et al. |
| 2016/0092570 A1 | 3/2016 | Ago et al. |
| 2016/0092588 A1 | 3/2016 | Li |
| 2016/0098464 A1 | 4/2016 | Burke et al. |
| 2016/0103592 A1 | 4/2016 | Prophete et al. |
| 2016/0103883 A1 | 4/2016 | Ramani et al. |
| 2016/0110109 A1 | 4/2016 | Cowling et al. |
| 2016/0112531 A1 | 4/2016 | Milton et al. |
| 2016/0117129 A1 | 4/2016 | Shrader et al. |
| 2016/0117373 A1 | 4/2016 | Dang et al. |
| 2016/0119388 A1 | 4/2016 | Sitrick et al. |
| 2016/0139849 A1 | 5/2016 | Chaw et al. |
| 2016/0140174 A1 | 5/2016 | Weyerhaeuser et al. |
| 2016/0140196 A1 | 5/2016 | Kobayashi et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210300 A1 | 7/2016 | Plakhov et al. |
| 2016/0210340 A1 | 7/2016 | Cai et al. |
| 2016/0212007 A1 | 7/2016 | Alatorre et al. |
| 2016/0216873 A1 | 7/2016 | Filippi et al. |
| 2016/0224532 A1 | 8/2016 | Miller et al. |
| 2016/0246840 A1 | 8/2016 | Masiero et al. |
| 2016/0253361 A1 | 9/2016 | Nguyen et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russell |
| 2016/0292285 A1 | 10/2016 | Lee et al. |
| 2016/0306849 A1 | 10/2016 | Curino et al. |
| 2016/0316014 A1 | 10/2016 | Radu et al. |
| 2016/0328443 A1 | 11/2016 | Abraham et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |
| 2016/0364424 A1 | 12/2016 | Chang et al. |
| 2016/0371356 A1 | 12/2016 | Lee et al. |
| 2016/0373423 A1 | 12/2016 | Naibo |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0011039 A1 | 1/2017 | Spaulding et al. |
| 2017/0012909 A1 | 1/2017 | Lieu |
| 2017/0024390 A1 | 1/2017 | Vuppala et al. |
| 2017/0024912 A1 | 1/2017 | De Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0052654 A1 | 2/2017 | Cervelli et al. |
| 2017/0060903 A1 | 3/2017 | Botea et al. |
| 2017/0061286 A1 | 3/2017 | Kumar et al. |
| 2017/0068678 A1 | 3/2017 | Tripathi et al. |
| 2017/0083368 A1 | 3/2017 | Bishop et al. |
| 2017/0083386 A1 | 3/2017 | Wing et al. |
| 2017/0083588 A1 | 3/2017 | Lang et al. |
| 2017/0097957 A1 | 4/2017 | Bourbonnais et al. |
| 2017/0103116 A1 | 4/2017 | Hu et al. |
| 2017/0111675 A1 | 4/2017 | Song et al. |
| 2017/0116289 A1 | 4/2017 | Deshmukh et al. |
| 2017/0124151 A1 | 5/2017 | Ji et al. |
| 2017/0140011 A1 | 5/2017 | Kuefer et al. |
| 2017/0147224 A1 | 5/2017 | Kumar et al. |
| 2017/0147640 A1 | 5/2017 | Gaza et al. |
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0177697 A1 | 6/2017 | Lee et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Dong et al. |
| 2017/0228460 A1 | 8/2017 | Amel et al. |
| 2017/0228711 A1 | 8/2017 | Chawla et al. |
| 2017/0235799 A1 | 8/2017 | Miller et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0262754 A1 | 9/2017 | Mizuno et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0308573 A1 | 10/2017 | Brisebois et al. |
| 2017/0308610 A1 | 10/2017 | Mullins et al. |
| 2017/0315677 A1 | 11/2017 | Rice et al. |
| 2017/0315749 A1 | 11/2017 | Valine et al. |
| 2017/0329543 A1 | 11/2017 | Slater et al. |
| 2017/0344609 A1 | 11/2017 | Wadley et al. |
| 2017/0351951 A1 | 12/2017 | Santos et al. |
| 2017/0352380 A1 | 12/2017 | Doumbouya et al. |
| 2017/0364506 A1 | 12/2017 | Stern et al. |
| 2017/0373935 A1 | 12/2017 | Subramanian et al. |
| 2018/0004364 A1 | 1/2018 | Wu |
| 2018/0004745 A1 | 1/2018 | Finkelstein et al. |
| 2018/0011655 A1 | 1/2018 | Gredler et al. |
| 2018/0024701 A1 | 1/2018 | Sanches et al. |
| 2018/0025041 A1 | 1/2018 | Gray et al. |
| 2018/0032478 A1 | 2/2018 | Felderman et al. |
| 2018/0032570 A1 | 2/2018 | Miller et al. |
| 2018/0039399 A1 | 2/2018 | Kaltegaertner et al. |
| 2018/0046503 A1 | 2/2018 | Feng et al. |
| 2018/0052765 A1 | 2/2018 | Imbierski |

(56)                    References Cited

U.S. PATENT DOCUMENTS

| | | |
|---|---|---|
| 2018/0060325 A1 | 3/2018 | Taylor et al. |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0075097 A1 | 3/2018 | Hwang |
| 2018/0081579 A1 | 3/2018 | Verrilli et al. |
| 2018/0081941 A1 | 3/2018 | Foebel et al. |
| 2018/0089265 A1 | 3/2018 | Gerard |
| 2018/0089267 A1 | 3/2018 | Hatem et al. |
| 2018/0089272 A1 | 3/2018 | Bath et al. |
| 2018/0089276 A1 | 3/2018 | Victor et al. |
| 2018/0089324 A1 | 3/2018 | Pal et al. |
| 2018/0113902 A1 | 4/2018 | Chen et al. |
| 2018/0113945 A1 | 4/2018 | Dhillon et al. |
| 2018/0121426 A1 | 5/2018 | Barsness et al. |
| 2018/0123918 A1 | 5/2018 | Steinhauser et al. |
| 2018/0124031 A1 | 5/2018 | Krishnaprasad et al. |
| 2018/0157711 A1 | 6/2018 | Lee |
| 2018/0157767 A1 | 6/2018 | Balyan |
| 2018/0159782 A1 | 6/2018 | Madan et al. |
| 2018/0165310 A1 | 6/2018 | Coll et al. |
| 2018/0165331 A1 | 6/2018 | Zhang et al. |
| 2018/0173390 A1 | 6/2018 | Dunne et al. |
| 2018/0173477 A1 | 6/2018 | Porwal et al. |
| 2018/0173753 A1 | 6/2018 | Pei et al. |
| 2018/0173759 A1 | 6/2018 | Barsness et al. |
| 2018/0189328 A1 | 7/2018 | Frazier et al. |
| 2018/0205672 A1 | 7/2018 | Dong et al. |
| 2018/0218017 A1 | 8/2018 | Milrud |
| 2018/0218045 A1 | 8/2018 | Pal et al. |
| 2018/0225095 A1 | 8/2018 | Kamalakantha et al. |
| 2018/0232394 A1 | 8/2018 | Danziger et al. |
| 2018/0246983 A1 | 8/2018 | Rathod |
| 2018/0285417 A1 | 10/2018 | Lazovic et al. |
| 2018/0285445 A1 | 10/2018 | Lu |
| 2018/0307735 A1* | 10/2018 | Thayer .................. G06F 16/211 |
| 2018/0314745 A1 | 11/2018 | Filippi et al. |
| 2018/0322017 A1 | 11/2018 | Maccanti et al. |
| 2018/0322168 A1 | 11/2018 | Levine et al. |
| 2018/0322169 A1 | 11/2018 | Kaufman et al. |
| 2018/0329965 A1 | 11/2018 | Nishino et al. |
| 2018/0329987 A1 | 11/2018 | Tata et al. |
| 2018/0348715 A1 | 12/2018 | Bandaru et al. |
| 2018/0349095 A1 | 12/2018 | Wu et al. |
| 2018/0357320 A1 | 12/2018 | Li et al. |
| 2018/0373756 A1 | 12/2018 | Madala |
| 2019/0005044 A1 | 1/2019 | Bell |
| 2019/0028571 A1 | 1/2019 | Tomiyama |
| 2019/0034528 A1 | 1/2019 | Lintz |
| 2019/0042146 A1 | 2/2019 | Wysoczanski et al. |
| 2019/0050579 A1 | 2/2019 | Abraham et al. |
| 2019/0065278 A1 | 2/2019 | Jeuk et al. |
| 2019/0065553 A1* | 2/2019 | Young .................. G06F 16/258 |
| 2019/0065567 A1 | 2/2019 | Griffith et al. |
| 2019/0073610 A1 | 3/2019 | Rousselot |
| 2019/0095241 A1 | 3/2019 | Ago et al. |
| 2019/0095508 A1 | 3/2019 | Porath et al. |
| 2019/0098106 A1 | 3/2019 | Mungel et al. |
| 2019/0109848 A1 | 4/2019 | Clark et al. |
| 2019/0138640 A1 | 5/2019 | Pal et al. |
| 2019/0138642 A1 | 5/2019 | Pal et al. |
| 2019/0146970 A1 | 5/2019 | Chamieh et al. |
| 2019/0163756 A1 | 5/2019 | Bull et al. |
| 2019/0229924 A1 | 7/2019 | Chhabra et al. |
| 2019/0236182 A1 | 8/2019 | Tiyyagura et al. |
| 2019/0236203 A1 | 8/2019 | De Boer |
| 2019/0258635 A1 | 8/2019 | Pal et al. |
| 2019/0272271 A1 | 9/2019 | Bhattacharjee et al. |
| 2019/0294344 A1 | 9/2019 | Hahn et al. |
| 2019/0303409 A1 | 10/2019 | Nishino et al. |
| 2019/0340291 A1* | 11/2019 | Raman ................ G06F 16/2255 |
| 2019/0342380 A1 | 11/2019 | Thota et al. |
| 2019/0349426 A1 | 11/2019 | Smith et al. |
| 2019/0370369 A1 | 12/2019 | Kulkarni |
| 2019/0379650 A1 | 12/2019 | Hale et al. |
| 2020/0050586 A1* | 2/2020 | Pal .......................... G06F 16/148 |
| 2020/0050607 A1 | 2/2020 | Pal et al. |
| 2020/0050612 A1* | 2/2020 | Bhattacharjee ..... G06F 16/2471 |
| 2020/0057818 A1 | 2/2020 | Kim |
| 2020/0065303 A1 | 2/2020 | Bhattacharjee et al. |
| 2020/0082010 A1 | 3/2020 | Bodziony et al. |
| 2020/0089794 A1 | 3/2020 | Frantz et al. |
| 2020/0110842 A1 | 4/2020 | Teo et al. |
| 2020/0133916 A1 | 4/2020 | Liao et al. |
| 2020/0134683 A1 | 4/2020 | Boren et al. |
| 2020/0167433 A1 | 5/2020 | Karayev et al. |
| 2020/0257680 A1 | 8/2020 | Danyi et al. |
| 2020/0301941 A1 | 9/2020 | Wilson et al. |
| 2020/0327252 A1 | 10/2020 | McFall et al. |
| 2020/0364141 A1 | 11/2020 | Sinha et al. |
| 2020/0364279 A1 | 11/2020 | Pal et al. |
| 2020/0387390 A1 | 12/2020 | Bat Ulzii et al. |
| 2020/0401591 A1* | 12/2020 | Bhoite .................. G06F 16/248 |
| 2020/0409948 A1 | 12/2020 | Corvinelli et al. |
| 2021/0019557 A1 | 1/2021 | Jothi et al. |
| 2021/0034623 A1* | 2/2021 | Sabhanatarajan ... G06F 16/2477 |
| 2021/0034625 A1 | 2/2021 | Shah et al. |
| 2021/0049177 A1 | 2/2021 | Bhattacharjee et al. |
| 2021/0064652 A1 | 3/2021 | Wang et al. |
| 2021/0089601 A1 | 3/2021 | Osann, Jr. |
| 2021/0109902 A1 | 4/2021 | Glasser |
| 2021/0117425 A1* | 4/2021 | Rao ..................... H04L 41/0806 |
| 2021/0149895 A1 | 5/2021 | Tran et al. |
| 2021/0224051 A1 | 7/2021 | Bequet et al. |
| 2021/0256019 A1 | 8/2021 | Prophete et al. |
| 2021/0286633 A1 | 9/2021 | Bar-On et al. |
| 2021/0286812 A1 | 9/2021 | Neugebauer et al. |
| 2021/0303570 A1 | 9/2021 | Kondiles et al. |
| 2021/0390103 A1 | 12/2021 | Cejudo et al. |
| 2022/0019597 A1 | 1/2022 | Takagi et al. |
| 2022/0138606 A1 | 5/2022 | Pasour et al. |
| 2022/0164349 A1 | 5/2022 | Safaie et al. |
| 2022/0188306 A1 | 6/2022 | Bigdelu et al. |
| 2022/0197926 A1 | 6/2022 | Passey et al. |
| 2022/0207084 A1 | 6/2022 | Al-Omari et al. |
| 2022/0269727 A1 | 8/2022 | Batsakis et al. |
| 2022/0300711 A1 | 9/2022 | Elisco et al. |
| 2022/0309248 A1 | 9/2022 | Liu et al. |
| 2022/0309411 A1 | 9/2022 | Ramaswamy et al. |
| 2022/0327125 A1 | 10/2022 | Pal et al. |
| 2022/0327149 A1 | 10/2022 | Pal et al. |
| 2023/0031327 A1 | 2/2023 | Bourbie et al. |
| 2023/0072930 A1* | 3/2023 | Shah ..................... G06F 16/244 |
| 2023/0130267 A1 | 4/2023 | Mukherjee et al. |
| 2023/0144450 A1 | 5/2023 | Bhattacharjee et al. |
| 2023/0147068 A1 | 5/2023 | Rao et al. |
| 2023/0177047 A1 | 6/2023 | Pal et al. |
| 2023/0185818 A1 | 6/2023 | Oattes et al. |
| 2023/0214386 A1 | 7/2023 | Pal et al. |
| 2023/0297213 A1 | 9/2023 | Coffey et al. |
| 2023/0315757 A1* | 10/2023 | DiPalma .............. G06F 16/275 |
| | | 707/611 |
| 2023/0315785 A1 | 10/2023 | Batsakis et al. |
| 2024/0013271 A1 | 1/2024 | Nunziata |
| 2024/0039802 A1 | 2/2024 | Avetoom |
| 2024/0086471 A1 | 3/2024 | Pal et al. |
| 2024/0143612 A1 | 5/2024 | Bigdelu et al. |
| 2024/0178001 A1 | 5/2024 | Li et al. |
| 2024/0220497 A1 | 7/2024 | Pal et al. |
| 2024/0256545 A1 | 8/2024 | James et al. |
| 2024/0320231 A1 | 9/2024 | Bhattacharjee et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 2453370 A1 | 5/2012 |
| EP | 3675418 A1 | 7/2020 |
| KR | 20200004835 A | 1/2020 |
| WO | 2007062429 A2 | 5/2007 |
| WO | 2020027867 A1 | 2/2020 |
| WO | 2020220216 A1 | 11/2020 |

(56) References Cited

FOREIGN PATENT DOCUMENTS

OTHER PUBLICATIONS

Bakliwal S., "A Comprehensive Guide to Apache Flink Ecosystem Components," Linkedin, Feb. 18, 2017, 7 Pages, Retrieved from URL: https://www.linkedin.com/pulse/comprehensive-guide-apache-flink-ecosystem-components-bakliwal/.

Beame P., et al., "Communication Steps for Parallel Query Processing," PODS 13: Proceedings of the 32nd ACM SIGMOD-SIGACT-SIGAI Symposium on Principles of Database Systems, Jun. 22-27, 2013, pp. 273-284.

Bitincka L., et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 Pages.

Cannon F., et al., "Updating Query and Action Panels Based on Interaction With Query Results," U.S. Appl. No. 17/444,152, filed Jul. 30, 2021, 98 Pages.

Carasso D., et al., "Exploring Splunk: Search Processing Language (SPL) Primer and Cookbook." Splunk Inc., CITO Research, New York, Apr. 2012, 156 Pages, (Nov. 28, 2018).

Chen T., et al., "Paralite: Supporting Collective Queries in Database System to Parallelize User-Defined Executable," 2012 12th IEEE/ACM International Symposium on Cluster, Clout and Grid Computing, IEEE Computer Society, May 2012, pp. 474-481.

Daxini M., "Netflix Keystone SPaaS: Real-time Stream Processing as a Service—ABD320—Reinvent 2017," Clip Slide, Slideshare, Dec. 14, 2017, 46 Pages, Retrieved from URL: https://www.slideshare.net/AmazonWebServices/netflix-keystone-spaas-realtime-stream-processing-as-a-service-abd320-reinvent-2017.

Dayal U., "Of Nests and Trees: A Unified Approach to Processing Queries That Contain Nested Subqueries, Aggregates, and Quanti-fiers," Proceedings of the 13th inti Conference on Very Large Data Bases [VLDB], Brighton, 1987, pp. 197-208.

Di S., et al., "Social-optimized Win-win Resource Allocation for Self-organizing Cloud," 2011 International Conference on Cloud and Service Computing, Dec. 12, 2011, pp. 251-258.

Ejarque J., et al., "Using Semantics for Resource Allocation in Computing Service Providers," IEEE Transactions on Services Computing, Jul. 7, 2008, vol. 2, pp. 583-587 (9 Pages).

Friedman E., et al., "SQL/MapReduce: A Practical Approach to Self-Describing, Polymorphic, and Parallelizable Use-Defined Functions," Proceedings of the VLDB Endowment, Aug. 24-28, 2009, pp. 1402-1413 (12 Pages).

Gotz D., et al., "A Methodology for Interactive Mining and Visual Analysis of Clinical Event Patterns Using Electronic Health Record Data," Journal of Biomedical Science, Apr. 1, 2014, vol. 48, pp. 148-159 (24 Pages).

Han Z., et al., "Elastic Allocator: An Adaptive Task Scheduler for Streaming Query in the Cloud," 2014 IEEE 8th international Symposium on Service Oriented System Engineering, IEEE Computer Society, 2014, pp. 284-289.

Hoque E., et al., "Applying Pragmatic Principles for Interaction with Visual Analytics," IEEE Transactions on Visualization and Computer Graphics, Jan. 2018, vol. 24, No. 1, pp. 309-318.

Hu N., et al., "Dynamic Optimization of Subquery Processing in Grid Database," Third International Conference on Natural Communication, Nov. 2007, vol. 5, 6 Pages.

Huang Q., et al., "Query-aware Locality-sensitive Hashing for Approximate Nearest Neighbor Search," Proceedings of the VLDB Endowment, Sep. 1, 2015, vol. 9, No. 1, 12 Pages.

Hull D.A., et al., "Querying across Languages: A Dictionary-based Approach to Multilingual Information Retrieval," Proceedings of the 19th Annual International ACM SIGIR Conference on Research and Development in Information Retrieval, Aug. 18, 1996, pp. 49-57.

Jayaram P., "SQL Union Overview, Usage, and Examples," SQLShack, Sep. 25, 2018, 13 Pages, [Retrieved on Mar. 8, 2021] Retrieved from URL: https://www.sqlshack.com/sql-union-overview-usage-and-examples/.

Kuo Y-H., et al., "Query Expansion for Hash-based Image Object Retrieval," MM '09: Proceedings of the 17th ACM International Conference on Multimedia, Oct. 19-24, 2009, pp. 65-74.

Limsopatham N., et al., "Learning to Combine Representations for Medical Records Search," SIGIR 13, ACM Conference, Jul. 28-Aug. 1, 2013, pp. 833-836.

Mcnamee P., et al., "Comparing Cross-Language Query Expansion Techniques by Degrading Translation Resources," Proceedings of the 25th Annual International ACM SIGIR Conference on Research and Development in Information Retrieval, SIGIR'02, Aug. 11-15, 2002, pp. 159-166 (8 Pages).

Metzger R., "Kafka + Flink: A Practical, How-To Guide," Ververica, Sep. 2, 2015, 13 Pages, Retrieved from URL: https://www.ververica.com/blog/kafka-flink-a-practical-how-to.

Myers W., "Skating Out the Graphics Display Pipeline," IEEE Computer Graphics & Applications, Jul. 1984, vol. 4, No. 7, pp. 60-65.

Nadanam P., et al., "QoS Evaluation for Web Services in Cloud Computing," IEEE, ICCCNT'12, Coimbatore, India, Jul. 26-28, 2012, 8 Pages.

Netflix Technology Blog; "Keystone Real-time Stream Processing Platform," Netflix Tech Blog, Sep. 10, 2018, 18 Pages, [Retrieved on Apr. 9, 2020] Retrieved from URL: https://netflixtechblog.com/keystone-real-time-stream-processing-platform-a3ee651812agi=71cc12ef6b89.

Nguyen D-T., et al., "An Index Scheme for Similarity Search on Cloud Computing using MapReduce over Docker Container," IMCOM '16: Proceedings of the 10 International Conference on Ubiquitous Information Management and Communication, Jan. 4-6, 2016, Article No. 60, pp. 1-6.

Paakkonen P., et al., "Reference Architecture and Classification of Technologies, Products and Services for Big Data Systems," Big Data Research, Dec. 2015, vol. 2, No. 4, pp. 166-186 (22 Pages).

Smith J., et al., "Distributed Query Processing on the Grid," Grid Computing GRID 2002: Proceedings of Third International Workshop Baltimore, Springer Veriag: Berlin/Heidelberg, MD, USA, Nov. 18, 2002, pp. 279-290 (12 Pages).

Splunk: "Splunk Cloud Splunk Cloud User Manual 8.0.2004," Splunk Turn Data in Doing, Splunk Inc, May 20, 2020, 66 Pages, Retrieved from URL: https://docs.splunk.com/Documentation.

Splunk: "Splunk Enterprise Overview 8.0.0," Splunk Turn Data into Doing, 2020, 17 Pages, [Retrieved on May 20, 2020], Retrieved from URL: https://docs.splunk.com/Documentation.

Splunk: "Splunk Quick Reference Guide," Splunk, 2019, 6 Pages, [Retrieved on May 20, 2020] Retrieved from URL: https://www.splunk.com/pdfs/solution-guides/splunk-quick-reference-guide.pdf.

Tutorialspoint: "SQL—Sub Queries, Subqueries with the INSERT Statement," 04 Pages, Retrieved on [Mar. 8, 2021], Retrieved from URL: https://www.tutorialspoint.com/sqi/sql-sub-queries.htm.

Vaid K., "QPS,KW-hr,MTBF,DeltaT,PUE,IOPS,DB/RH: A Day in the Life of a Datacenter Architect," Workshop on Managing Systems via Log Analysis and Machine Learning Techniques, (SLAML '10) , Vancouver, BC, Canada, Conference Reports, vol. 36, No. 1, Feb. 2011, pp. 104-110 (7 Pages), (Oct. 3, 2010).

Wongsuphasawat K., et al., "Querying Event Sequences by Exact Match or Similarity Search: Design and Empirical Evaluation," Interacting with Computers, Mar. 1, 2012, vol. 24, No. 2, pp. 55-68 (33 Pages).

Wu S., "Building Stream Processing as a Service (SPaaS)," Oreil-lystatic, Netflix Presentation, Dec. 2017, 113 Pages, Retrieved from URL: https://cdn.oreillystatic.com/en/assets/1/event/281/Building%20stream%20processing%20as%20a%20service%20at%20Netilix%20Presentation.pdf.

Yasu Y., et al., "Performance of Splunk for the TDAQ Information Service at the ATLAS Experiment," 2014 19th IEEE-NPSS Real Time Conference, May 2014, 6 Pages.

(56) References Cited

OTHER PUBLICATIONS

Zhang J., et al., "Coupling Browse and Search in Highly Interactive User Interfaces: A Study of the Relation Browser++," University of North Carolina-Chapel Hill, Edu, 2004, 09 Pages.

Zhu D., et al., "Combining Multi-level Evidence for Medical Record Retrieval," SHB'12: Proceedings of the 2012 International Workshop on Smart Health and Wellbeing, ACM Conferences, Oct. 29, 2012, pp. 49-56.

* cited by examiner

RECEIVE DATA

GENERATE EVENTS

GROUP EVENTS

STORE EVENTS

202

204

206

208

100

HOST DEVICE 104 / DATA SOURCE

DATA INTAKE AND QUERY SYSTEM 102

INTAKE 110

INDEXING 112

QUERY 114

STORAGE 116

CLIENT COMPUTING DEVICE 106

302

302A 127.0.0.1 -- eva [10/Oct/2000:13:55:36-0700] "GET/apache.gif HTTP/1.0" 200  2326  0.0947
127.0.0.1 -- emerson [10/Oct/2000:13:56:36-0700] "GET/eastwood.gif HTTP/1.0" 200 2980
0.0899                          302C        302B
127.0.0.3 -- eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif                    302E              302D
91.205.189.15 - - [28/Apr/2014:18:22:16] "GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

304

```
docker: {
        container_id: f7360a148a670c4c257f4ee024be81284b6017d72ae41ea8ee5d
}
kubernetes: {                                    304A
        container_name: kube-apiserver
        host: ip-172-20-43-173.ec2.internal
        labels: {
           k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal                304B
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}
```

306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

RECEIVE QUERY

402

PROCESS QUERY

404

DISTRIBUTE QUERY FOR EXECUTION

406

EXECUTE QUERY IN DISTRIBUTED MANNER

408

COMBINE PORTIONS/FINALIZE RESULTS

410

550A

```
|sdselect count from json_custom groupby time span=1d

SELECT to_unixtime(date_trunc('day', parse_datetime("time", 'yyyy-MM-dd' 'T'
'HH:mm:ss.SSS') AT TIME ZONE 'America/Los_Angeles'))AS "time", count(*) AS "count"
    FROM "allan_json_test3 "

GROUP BY to_unixtime(date_trunc('day', parse_datetime("time",'yyyy-MM-dd' 'T' 'HH:mm:
    ss.SSS') AT TIME ZONE 'America/Los_Angeles')) ORDER BY 1 LIMIT 100000
```

552A

550B

```
|sdselect count from json_custom groupby time span=3d
```

552B

```
SELECT to_unixtime(if(cast(-1 *(floor(0.5 + (to_unixtime(date_trunc('day', parse_datetime
("time", 'yyyy-mm-dd' 'HH:mm:ss.SSS') AT TIME ZONE 'America/Los_Angeles'))- 0) / 86400) % 3)
as bigint)!=0, date_add('day', cast(-1 *(floor(0.5 + (to_unixtime (date_trunc('day', parse_
datetime ("time", 'YYYY-MM-dd' 'T' 'HH:mm:ss.SSS') AT TIME ZONE'America/Los_Angeles'))-0) /
86400) % 3) as bigint), date_trunc('day', parse_datetime("time", 'YYYY-MM-dd' 'T' 'HH:mm:ss.
SSS') AT TIME ZONE 'America/Los_Angeles')), date_trunc('day', Parse_datetime("time", 'YYYY-
mm-dd' 'T' 'HH:mm:ss.SSS') AT TIME ZONE 'America/Los_Angeles'))) AS "time", count(*) AS "count"
FROM "allan_json_test3" GROUP BY to-unixtime(if(cast(-1 *(floor(0.5 + (to_unixtime(date_trunc
('day',parse_datetime("time", 'yyyy-MM-dd' 'T' 'HH:mm:ss.SSS') AT TIME ZONE 'America/Los_
Angeles')) - 0) / 86400) % 3) as bigint) != 0, date_add('day',cast(-1 *(floor(0.5 + (to_
unixtime(date_trunc('day', parse_datetime("time", 'YYYY-MM-dd' 'HH:mm:ss.SSS') AT TIME ZONE
'America/Los_Angeles')) - 0)/ 86400) % 3) as bigint), date_trunc('day', parse_datetime
("time", 'YYYY-MM-dd' 'T' 'HH:mm:ss.SSS') AT TIME ZONE 'America/Los_Angeles'), date_trunc
('day', parse_datetime("time", 'YYYY-MM-dd' 'T' 'HH:mm:ss.SSS') AT TIME ZONE 'America/Los
_Angeles'))) ORDER BY 1 LIMIT 100000
```

550C

```
|sdselect earliest(host) from json_custom
```

552C

```
SELECT DISTINCT last_value(host) OVER (ORDER BY "time" DESC RANGE BETWEEN UNBOUNDED
    PRECEDING AND UNBOUNDED FOLLOWING) AS "earliest(host)" FROM "allan_json_test3" LIMIT 100000
```

550D

```
|sdselect count(host) earliest(host) from json_custom
```

552D

```
SELECT DISTINCT count ("host") OVER (RANGE BETWEEN UNBOUNDED PRECEDING AND UNBOUNDED FOLLOWING)
AS "count(host)", last_value("host") OVER (ORDER BY "time" DESC RANGE BETWEEN UNBOUNDED
    PRECEDING AND UNBOUNDED FOLLOWING) AS "earliest(host)" FROM "allan-json-test3" Limit 100000
```

FIG. 5B

702 — RECEIVE QUERY IN FIRST QUERY LANGUAGE

704 — DETERMINE QUERY ASSOCIATED WITH EXTERNAL DATA SYSTEM

706 — TRANSLATE QUERY INTO SECOND QUERY LANGUAGE

708 — COMMUNICATE SECOND QUERY LANGUAGE QUERY TO EXTERNAL DATA SYSTEM

710 — RETRIEVE RESULTS

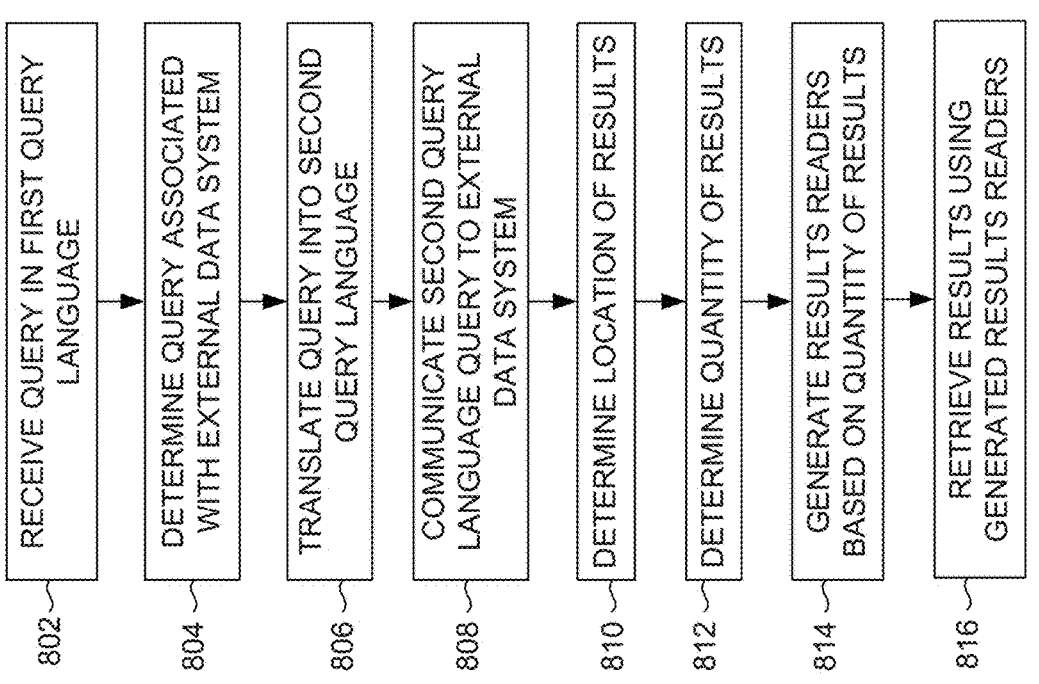

802 — RECEIVE QUERY IN FIRST QUERY LANGUAGE

804 — DETERMINE QUERY ASSOCIATED WITH EXTERNAL DATA SYSTEM

806 — TRANSLATE QUERY INTO SECOND QUERY LANGUAGE

808 — COMMUNICATE SECOND QUERY LANGUAGE QUERY TO EXTERNAL DATA SYSTEM

810 — DETERMINE LOCATION OF RESULTS

812 — DETERMINE QUANTITY OF RESULTS

814 — GENERATE RESULTS READERS BASED ON QUANTITY OF RESULTS

816 — RETRIEVE RESULTS USING GENERATED RESULTS READERS

FIG. 8

READING QUERY RESULTS FROM AN EXTERNAL DATA SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

This application is a continuation of U.S. patent application Ser. No. 17/816,254, filed on Jul. 29, 2022, now U.S. Pat. No. 12,271,389, which claims the benefit of to U.S. Prov. App. No. 63/366,229, filed Jun. 10, 2022, the contents of both of which are incorporated herein by reference for all purposes. This matter is also related to U.S. patent application Ser. No. 17/816,132, filed Jul. 29, 2022, now issued as U.S. Pat. No. 12,141,137, which is incorporated herein by reference for all purposes.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an example of machine data received by the data intake and query system.

FIG. 5B is a diagram illustrating various non-limiting examples of first query language or pre-translated queries and second query language or translated queries.

FIG. 8 is a flow diagram illustrative of an example of a routine implemented by a computing device of a data intake and query system to retrieve (partial) results generated by an external data system.

DETAILED DESCRIPTION

Figure 2:
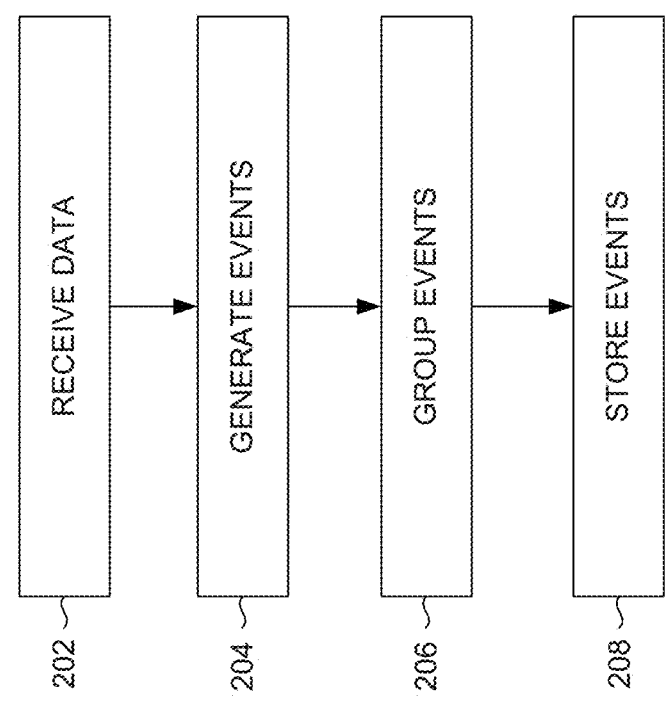
FIG. 2 is a flow diagram illustrating an example of a routine implemented by the data intake and query system to process, index, and store data.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data, which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some cases, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some cases, the configuration files and/or extraction rules described above can be stored in a catalog, such as a metadata catalog. In certain cases, the content of the extraction rules can be stored as rules or actions in the metadata catalog. For example, the identification of the data to which the extraction rule applies can be referred to a rule and the processing of the data can be referred to as an action.

1.0. Operating Environment

Figure 1:
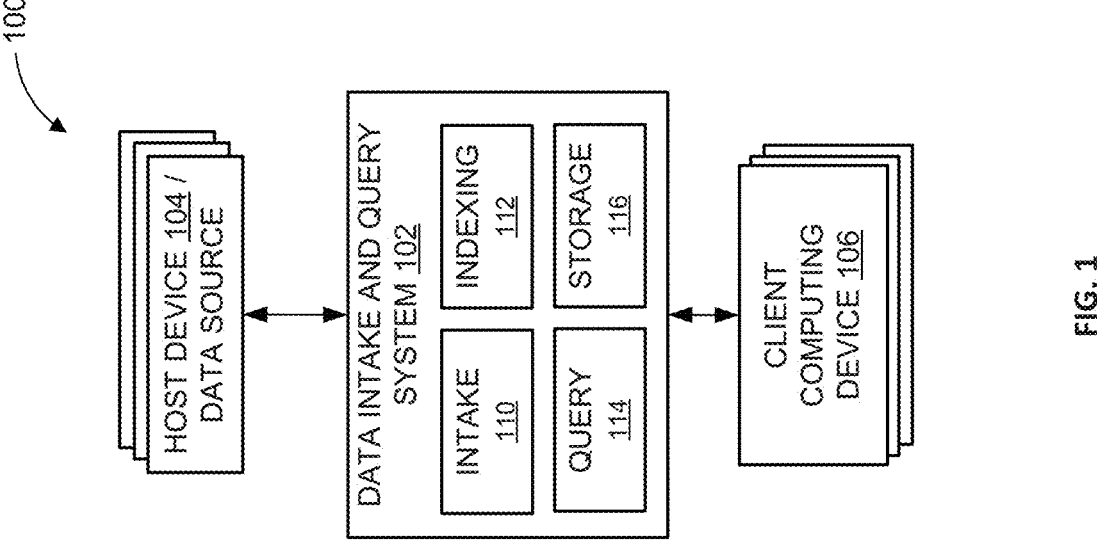
FIG. 1 is a block diagram of an example of a data processing environment.

FIG. 1 is a block diagram of an example of a data processing environment 100. In the illustrated example, the environment 100 includes a data intake and query system 102, one or more host devices 104, and one or more client computing devices 106 (generically referred to as client device(s) 106).

The data intake and query system 102, host devices 104, and client computing devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client computing device 106 can correspond to a distinct computing device that can configure, manage, or sends queries to the system 102. Examples of a client computing device 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client computing device 106 can include a hosted, virtualized, or containerized device, such as an isolated execution environment, that shares computing resources (e.g., processor, memory, etc.) of a particular machine with other isolated execution environments.

The client computing devices 106 can interact with the system 102 (or a host device 104) in a variety of ways. For example, the client computing devices 106 can communicate with the system 102 (or a host device 104) over an Internet (Web) protocol, via a gateway, via a command line interface, via a software developer kit (SDK), a standalone application, etc. As another example, the client computing devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client computing device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client computing devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some cases, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time (s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some cases, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain cases, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored, or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some cases, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated example, the system 102 is shown having four subsystems 110, 112, 114, 116. However, it will be understood that the system 102 may include any one or any combination of the intake system 110, indexing system 112, query system 114, or storage system 116. Further, in certain cases, one or more of the intake systems 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain cases, the components of the different systems may be distinct from each other or there may be some overlap. For example, one component (non-limiting example: indexing node) of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like AWS S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some cases, the intake system can include multiple distributed computing devices or components working concurrently to ingest the data.

The intake system 110 can receive data from the host devices 104 in a variety of formats or structures. In some cases, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

As described herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As described herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client computing devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some cases, the query system 114 can store some or all of the query results in the storage system 116.

In some cases, the storage system 116 may include one or more data stores associated with or coupled to the components of the indexing system 112 that are accessible via a system bus or local area network. For example, in certain cases, indexing nodes can be associated with dedicated data stores in which they can store data that they process. In some such cases, the indexing nodes can also be used as search nodes to search the data stored by their respective data stores. In certain cases, the storage system 116 may be a shared storage system 116, like AWS S3 or Google Cloud Storage, that are accessible via a wide area network. For example, in some cases, after processing data, an indexing node can store it to a shared storage system 116. In some such cases, the search nodes (or indexing nodes) can search data stored by any of the indexing nodes in the shared storage system 116.

As mentioned, and as will be described in greater detail below, the storage system 116 can be made up of one or more data stores storing data that has been processed by the indexing system 112. In some cases, the storage system includes data stores of the components of the indexing system 112 and/or query system 114. In certain cases, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some cases, the shared storage system 116 can correspond to cloud storage, such as AWS Simple Storage Service (S3) or Elastic Block Storage (EBS), Google Cloud Storage, Microsoft Azure Storage, etc.

In some cases, indexing system 112 can read to and write from the shared storage system 116. For example, the indexing system 112 can copy buckets of data from its local or shared data stores to the shared storage system 116. In certain cases, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some cases, the intake system 110 does not have access to the shared storage system 116. However, in some cases, one or more components of the intake system 110 can write data to the shared storage system 116 that can be read by the indexing system 112.

As described herein, in some cases, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some cases, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some cases, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In cases where the system 102 is implemented in a shared computing resource environment, the orchestration system can facilitate the creation and/or destruction of isolated execution environments or instances of the components of the system 102, etc.

In certain cases, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some cases, the system 102 can store the contextual information in a catalog, as described herein. In certain cases, the contextual information can correspond to information that the system 102 has determined or learned based on use. In some cases, the contextual information can be stored as annotations (manual annotations and/or system annotations), as described herein.

In certain cases, the system 102 can include an additional catalog that monitors the location and storage of data in the storage system 116 to facilitate efficient access of the data during search time. In certain cases, such a catalog may form part of the storage system 116.

In some cases, the system 102 can include a gateway or other mechanism to interact with external devices or to facilitate communications between components of the system 102. In some cases, the gateway can be implemented using an application programming interface (API). In certain cases, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain cases, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain cases, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such cases where components are shared by multiple tenants, the components can maintain separate directories for the different tenants to ensure their mutual exclusivity and/or independence from each other. Similarly, in some such cases, the system 102 can use different hosting computing systems or different isolated execution environments to process the data from the different tenants as part of the intake system 110, indexing system 112, and/or query system 114.

In some cases, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain cases, an indexing system 112 (or certain components thereof) can be instantiated and designated for a particular tenant or shared by multiple tenants. In some cases where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such cases, the four indexing nodes can be reserved for Tenant A and the two indexing nodes can be reserved for Tenant B, even if Tenant A and Tenant B are not using the reserved indexing nodes.

In cases where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant or terminated. Further, in some cases, a component of the indexing system 112 can concurrently process data from the different tenants.

In some cases, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an example of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some cases, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In some cases, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain cases, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some cases, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some cases, a timestamp may be included in the metadata fields. These metadata fields may include any number of "default fields" that are associated with all events, and may also include one more custom fields as defined by a user. In certain cases, the default metadata fields associated with each event may include a host, source, and sourcetype field including or in addition to a field storing the timestamp.

In certain cases, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some cases, the indexing system 112 can group events based on time. For example, events generated within a particular time period or events that have a time stamp within a particular time period can be grouped together to form a bucket. A non-limiting example of a bucket is described herein with reference to FIG. 3B.

In certain cases, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some cases, as part of grouping events together, the indexing system 112 can generate one or more inverted indexes for a particular group of events. A non-limiting example of an inverted index is described herein with reference to FIG. 3C. In certain cases, the inverted indexes can include location information for events of a bucket. For example, the events of a bucket may be compressed into one or more files to reduce their size. The inverted index can include location information indicating the particular file and/or location within a particular file of a particular event.

In certain cases, the inverted indexes may include keyword entries or entries for field values or field name-value pairs found in events. In some cases, a field name-value pair can include a pair of words connected by a symbol, such as an equal's sign or colon. The entries can also include location information for events that include the keyword, field value, or field value pair. In this way, relevant events can be quickly located. In some cases, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain cases, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3B:
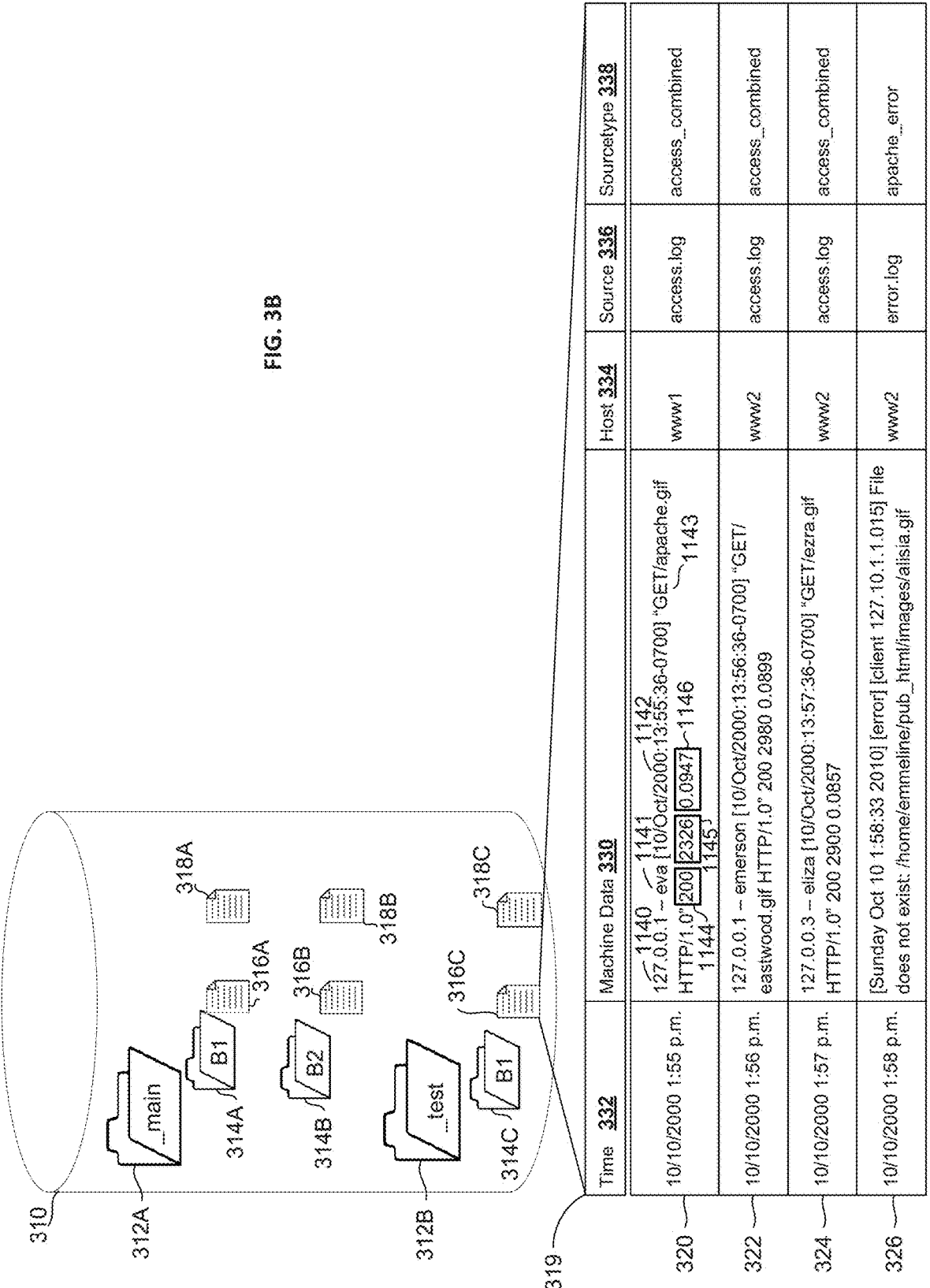
FIGS. 3B and 3C are block diagrams illustrating examples of various data structures for storing data processed by the data intake and query system.
Figure 3C:
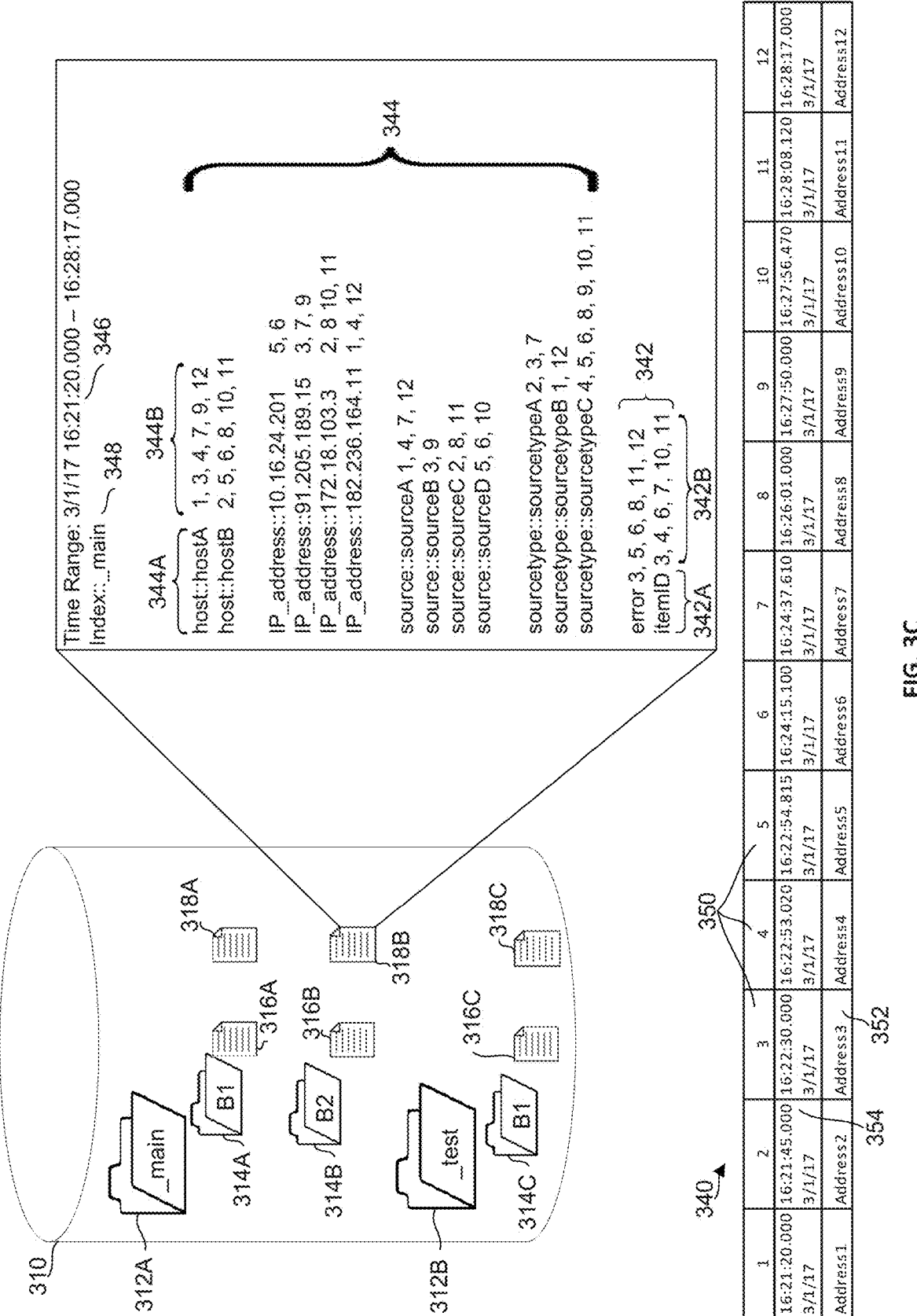

At block 208, the indexing system 112 stores the events with an associated timestamp in the storage system 116, which may be in a local data store and/or in a shared storage system. Timestamps enable a user to search for events based on a time range. In some cases, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some cases, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain cases, the component that generates the events and/or stores the events (indexing node) can also be assigned to search the events. In some cases, separate components can be used for generating and storing events (indexing node) and for searching the events (search node).

By storing events in a distributed manner (either by storing the events at different components or in a shared storage system 116), the query system 114 can analyze events for a query in parallel. For example, using mapreduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some cases, each bucket may be associated with an identifier, a time range, and a size constraint. In certain cases, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In cases where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some cases, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some cases, a frozen bucket may be stored in slower and/or larger memory, such as a hard disk, and may be stored in offline and/or remote storage.

In some cases, components of the indexing system 112 may not include a cold directory and/or cold or frozen buckets. For example, in cases where buckets are copied to a shared storage system 116 and searched by separate components of the query system 114, buckets can be deleted from components of the indexing system as they are stored to the storage system 116. In certain cases, the shared storage system 116 may include a home directory that includes warm buckets copied from the indexing system 112 and a cold directory of cold or frozen buckets as described above.

FIG. 3A is a block diagram illustrating an example of machine data received by the system 102. The machine data can correspond to data from one or more host devices 104 or data sources. As mentioned, the data source can correspond to a log file, data stream or other data structure that is accessible by a host device 104. In the illustrated example of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name: kube-apiserver, host: ip 172 20 43 173.ec2.internal, pod_id: 0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some cases, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain cases, the intake system 110 can enrich the received data. For example, the intake system may add one or more fields to the data received from the host devices 104, such as fields denoting the host, source, sourcetype, index, or tenant associated with the incoming data. In certain cases, the intake system 110 can perform additional processing on the incoming data, such as trans-forming structured data into unstructured data (or vice versa), identifying timestamps associated with the data, removing extraneous data, parsing data, indexing data, sepa-rating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some cases, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be under-stood that the logical division of data referenced by the term partition will be understood based on the context of its use.

FIGS. 3B and 3C are block diagrams illustrating cases of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustra-tive and is not intended to limit the data format in which the machine data and metadata is stored in various cases described herein. In one particular example, machine data can be stored in a compressed or encrypted format. In such cases, the machine data can be stored with or be associated with data that describes the compression or encryption scheme with which the machine data is stored. The infor-mation about the compression or encryption scheme can be used to decompress or decrypt the machine data, and any metadata with which it is stored, at search time.

In the illustrated example of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated example of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated example, the data store 310 includes a _main directory 312A associated with an index "_main" and a _test directory 312B associated with an index "_test." However, the data store 310 can include fewer or more directories. In some cases, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some cases, the data store 310 can include directories for each tenant and sub-directories for each index of each tenant, or vice versa. Accordingly, the directories 312A and 312B can, in certain cases, correspond to sub-directories of a tenant or include sub-directories for different tenants.

In the illustrated example of FIG. 3B, two sub-directories 314A, 314B of the _main directory 312A and one sub-directory 312C of the _test directory 312B are shown. The sub-directories 314A, 314B, 314C can correspond to buck-ets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding direc-tory 312), the system 102 can uniquely identify them.

Although illustrated as buckets "B1" and "B2," it will be understood that the buckets (and/or corresponding sub-directories 314) can be named in a variety of ways. In certain cases, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high-performance indexes or keyword indexes), permissions files, configuration files, etc. In the illustrated example of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated example, four events 320, 322, 324, 326 of the machine data file 316C are shown in four rows. Each event 320-326 includes machine data 330 and a timestamp 332. The machine data 330 can correspond to the machine data received by the system 102. For example, in the illustrated example, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated example, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain cases, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in cases in which the portion of machine data included in an event is unprocessed or otherwise unaltered, it is referred to herein as a portion of raw machine data. For example, in the illustrated example, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other cases, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated examples of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used in various cases of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an example of another file that can be included in one or more subdirectories 314 or buckets. Specifically, FIG. 3C illustrates an exploded view of an example of an inverted index 318B in the sub-directory 314B, associated with bucket "B2" of the index "_main," as well as an event reference array 340 associated with the inverted index 318B.

In some cases, the inverted indexes 318 can correspond to distinct time-series buckets. As such, each inverted index 318 can correspond to a particular range of time for an index. In the illustrated example of FIG. 3C, the inverted indexes 318A, 318B correspond to the buckets "B1" and "B2," respectively, of the index "_main," and the inverted index 318C corresponds to the bucket "B1" of the index "_test." In some cases, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain cases, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such cases, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated example of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some cases, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype:: sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example, if an event has a sourcetype "splunkd," host "www1" and token "warning," then the unique identifier for the event can appear in the field-value pair entries 344 "sourcetype:: splunkd" and "host::www1," as well as the token entry "warning." With reference to the illustrated example of FIG. 3C and the event that corresponds to the event reference 3, the event reference 3 is found in the field-value pair entries 344 "host::hostA," "source::sourceB," "sourcetype::source-typeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different source-types of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated example of FIG. 3C, since the event reference 7 appears in the field-value pair entry "source-type::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be asso-ciated with, an event reference array 340. The event refer-ence array 340 can include an array entry 350 for each event reference in the inverted index 318B. Each array entry 350 can include location information 352 of the event corre-sponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identi-fiers can be listed in chronological order or the value of the event reference can be assigned based on chronological data, such as a timestamp associated with the event referenced by the event reference. For example, the event reference 1 in the illustrated example of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabeti-cally (collectively or within a particular group), by entry origin (e.g., default, automatically generated, user-specified, etc.), by entry type (e.g., field-value pair entry, token entry, etc.), or chronologically by when added to the inverted index, etc. In the illustrated example of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
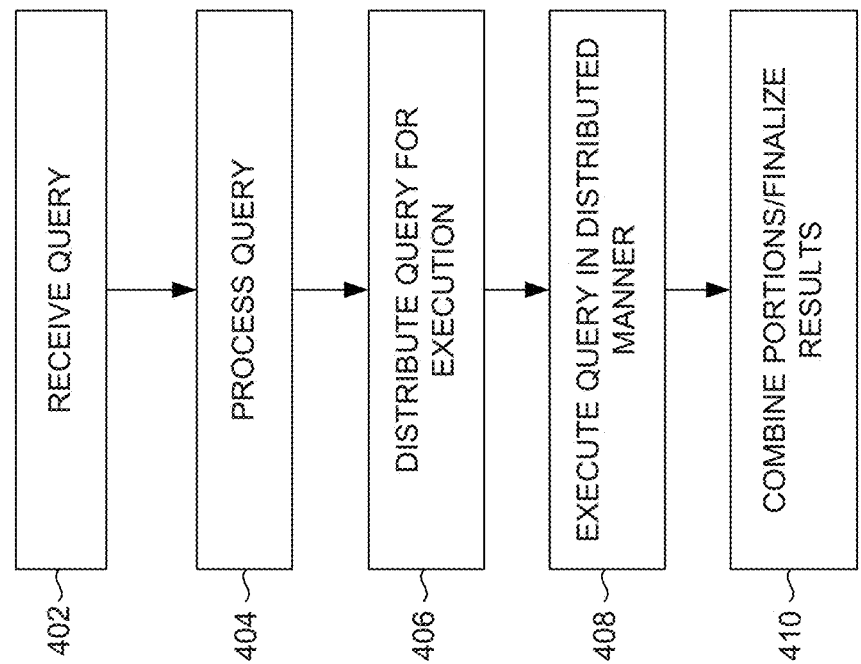
FIG. 4A is a flow diagram illustrating an example of a routine implemented by the query system to execute a query.

FIG. 4A is a flow diagram illustrating an example of a routine implemented by the query system 114 for executing a query. The blocks described herein with respect to the routine can be implemented by one or more components of the query system 114. For example, in some cases, blocks 402, 404, 406, and 410 can be implemented by a search head and blocks 408 can be implemented by a search head and one or more search nodes. However, it will be understood that a variety of combinations of component(s) can be used to implement the routine. For example, the search nodes may be used to also implement block 410.

At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authen-ticated user and/or review the query to determine that it is in a proper format for the data intake and query system 102, has correct semantics and syntax, etc. In addition, the query system 114 can determine what, if any, configuration files or other configurations to use as part of the query.

In addition, as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 114 distributes the determined portions or phases of the query to the appropriate components (e.g., search nodes). In some cases, the query system 114 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some cases, one or more rules for extracting field values may be specified as part of a sourcetype definition in a configuration file or in the query itself. In certain cases where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various cases of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various cases, a query can be formulated as a command sequence defined in a command line of a search UI. In some cases, a query can be formulated as a sequence of SPL commands. Some or all of the SPL commands in the sequence of SPL commands can be separated from one another by a pipe symbol "|." In such cases, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various cases described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some cases, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various cases is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one example, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
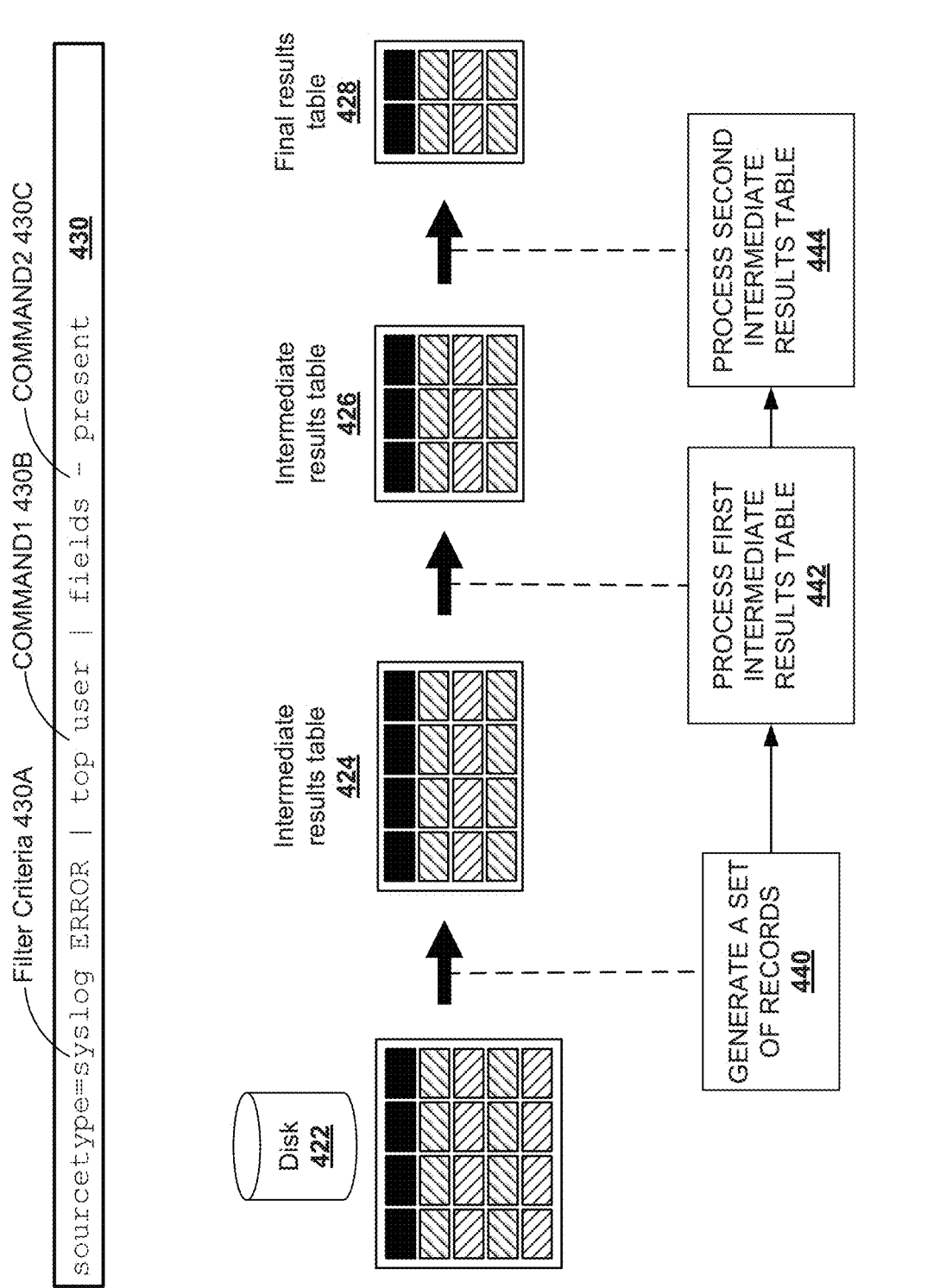
FIG. 4B provides a visual representation of the manner in which a pipelined command language or query can operate.

FIG. 4B provides a visual representation of the manner in which a pipelined command language or query can operate in accordance with the disclosed cases. The query 430 can be input by the user and submitted to the query system 114. In the illustrated example, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some cases, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different cases, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain cases, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
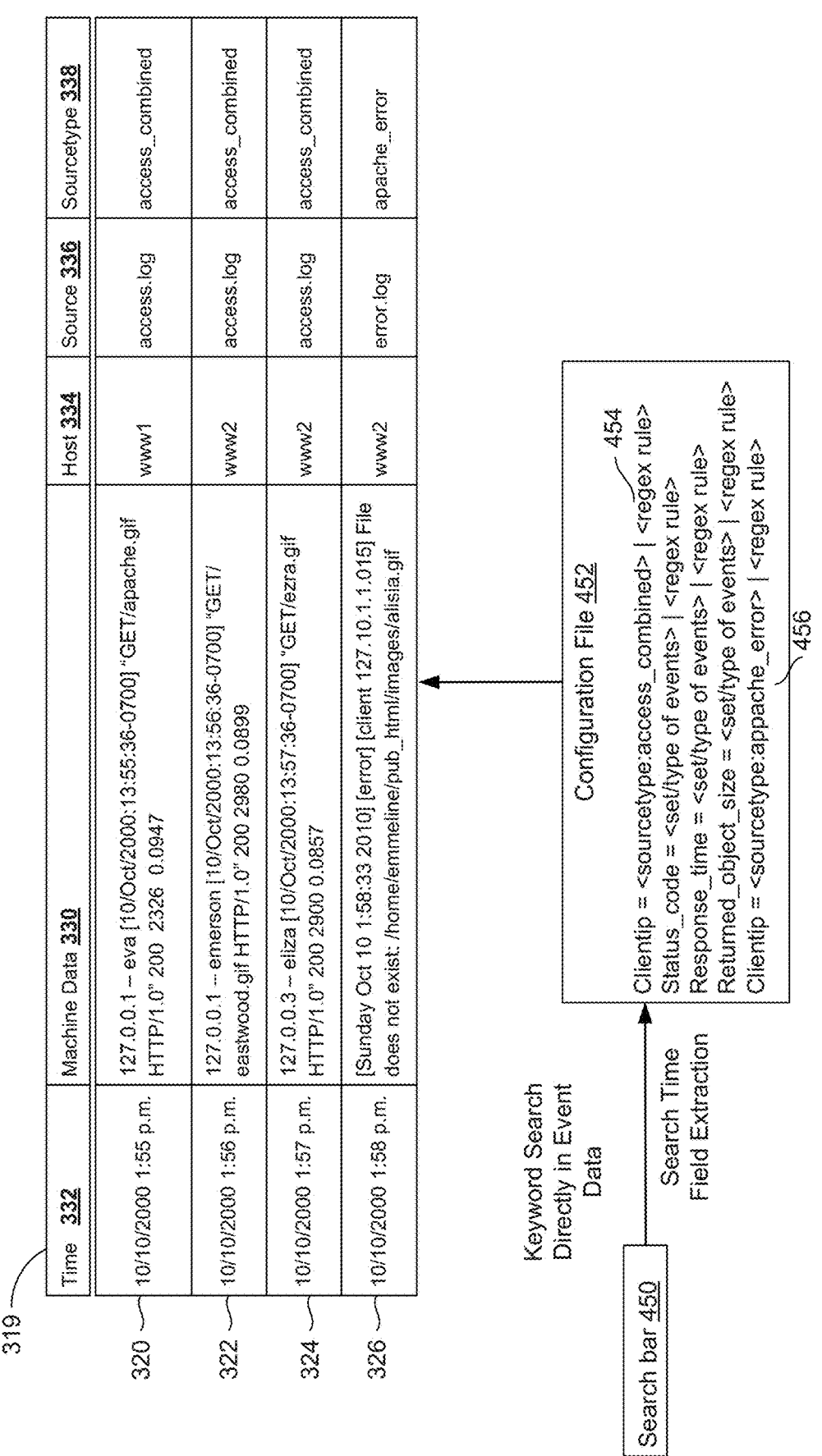
FIG. 4C is a block diagram illustrating an example of a configuration file that includes various extraction rules that can be applied to events.

FIG. 4C is a block diagram illustrating an example of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an example of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed examples. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more cases, locate configuration file 452 during the execution of the query.

Configuration file 452 may contain extraction rules for various fields, e.g., the "clientip" field. The extraction rules may be inserted into the configuration file 452 in a variety of ways. In some cases, the extraction rules can comprise regular expression rules that are manually entered in by the user.

In one or more examples, as noted above, a field extractor may be configured to automatically generate extraction rules for certain field values in the events when the events are being created, indexed, or stored, or possibly at a later time. In some cases, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some cases, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some cases, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error"|stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error"|prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some cases, the query system 114 can use distributed components for only mapping functions of a query (e.g., gather data, applying filter criteria, etc.). In certain cases, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An example of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An example of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations when all of the original data may be needed to determine the root cause of or contributing factors to a service issue.

In contrast, an IT monitoring application system stores large volumes of minimally processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
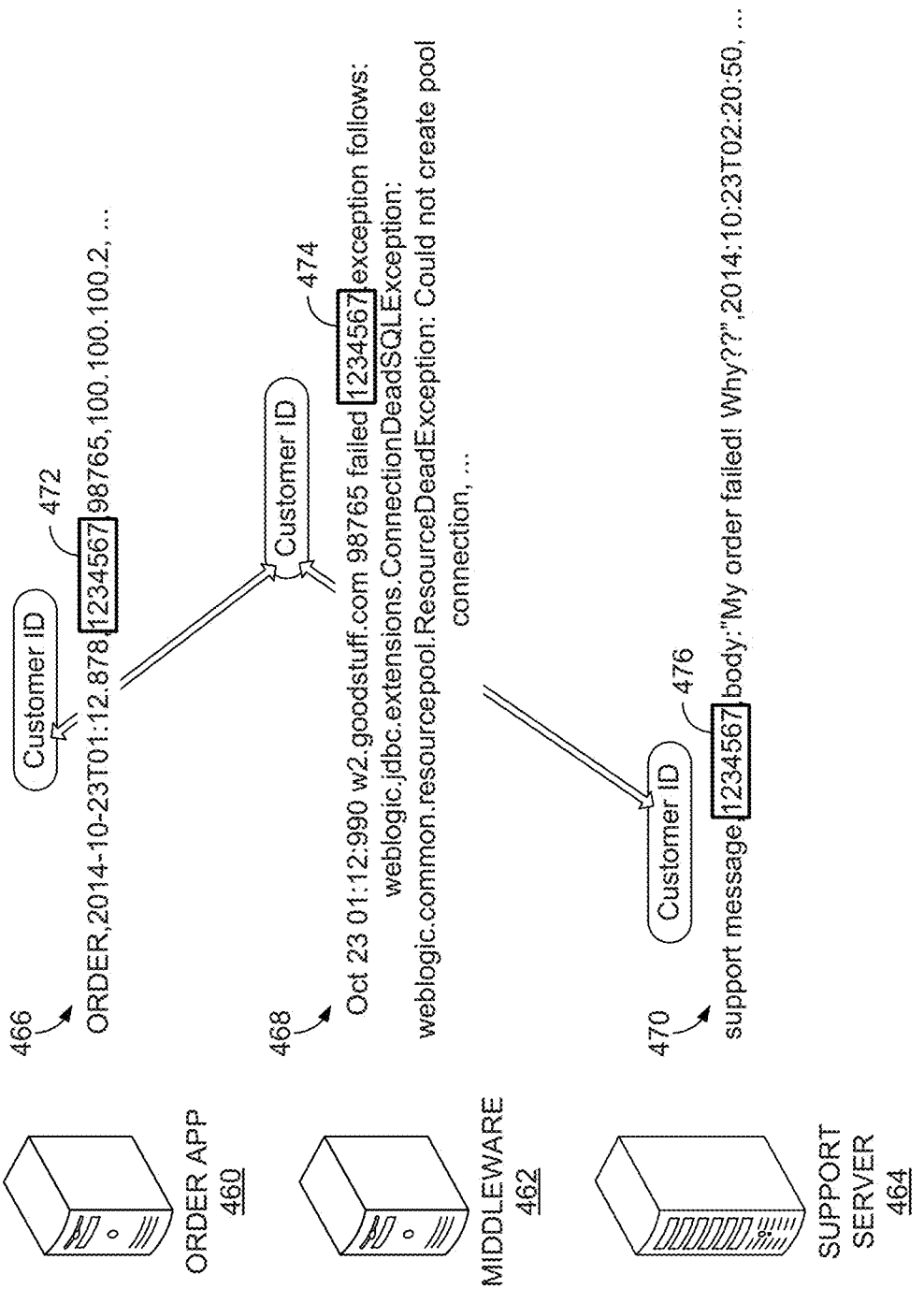
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Translating a Query for an External Data System

As described herein, a data intake and query system 102 can store significant quantities of data (also referred to herein as "system data" or "local system data"). Querying and/or processing the system data can provide useful information regarding associated host devices 104. In some cases, data related or relatable to the system data may be stored by one or more data systems that are separate and distinct from the data intake and query system 102 (also referred to herein as "external data systems" and the data stored thereby also referred to herein as "external data"). These external data systems may be another instance of the data intake and query system 102 (e.g., provided by the same company, having a similar architecture, components, processing, storage, and/or searching processes, and/or uses the same search language, etc.), or they may be unrelated and distinct data storage and processing systems that have a different architecture, components, processes, and/or that uses a different query language, etc. In either case, the external data stored by the external data systems may be related or relatable to the system data of the data intake and query system 102 but the external data system itself may not form part of the data intake and query system 102 (e.g., it may be provided by a different company, use or require different login credentials, etc.).

In some cases, the architecture of, amount of data stored by, or manner in which the data is stored by the external data system may increase the difficulty of obtaining data therefrom. For example, the external data system may store data that may be relevant for a search query. In some such cases, the data intake and query system 102 can communicate with the external data system to execute a query on the data. In some such cases, the data intake and query system 102 may translate a query that it received in a first query language that it understands (also referred to herein as a first query language query) into a different language that the external data system understands (also referred to herein as a second query language query).

Figure 5A:
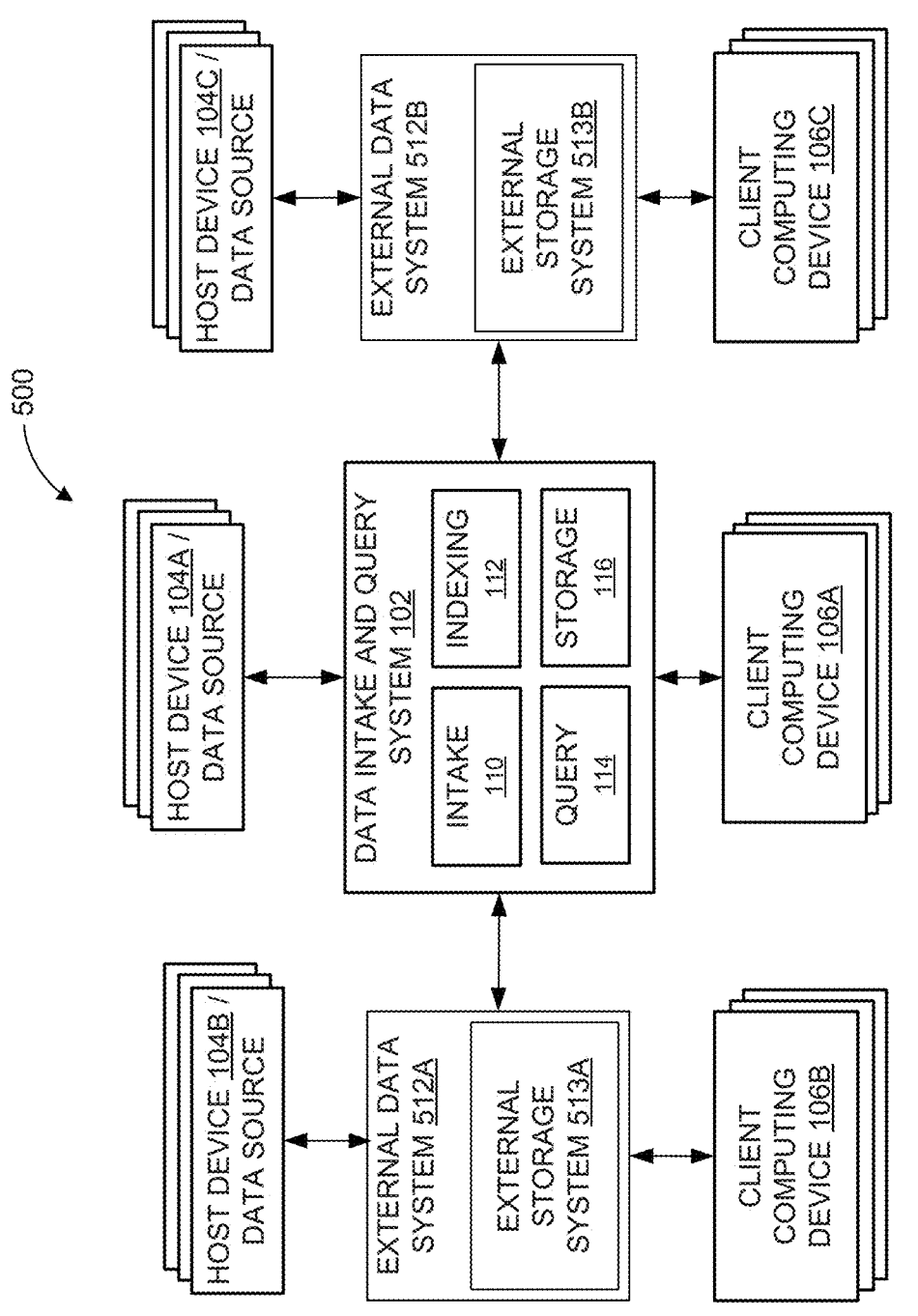
FIG. 5A is a block diagram illustrating an example environment that includes a data intake and query system and external data systems.

FIG. 5A is a block diagram illustrating an example environment 500 that includes a data intake and query system 102 and external data systems 512A, 512B (individually and collectively referred as external data system(s) 512). The external data systems 512 may be communicatively coupled (e.g., via a LAN, WAN, etc.) to the data intake and query system 102. In some cases, one or more components of the external data systems 512 are communicatively coupled to one or more particular components of the of the data intake and query system 102, such as a search head that is configured to receive and process queries for the data intake and query system 102.

One or more components of the data intake and query system 102, first external data system 512A, or second external data system 512 may be instantiated in a shared computing resource or cloud-based environment (e.g., as one or more isolated execution environments in a cloud-based service), such as Amazon AWS, Google Cloud Platform, or Microsoft Azure. In some cases, one or more components of the first external data system 512A or second external data system 512 may be instantiated in the same cloud-based environment and/or associated with the same cloud service account (account of a particular user, organization, or tenant to use a cloud-based service) with one or more components of the data intake and query system 102 (e.g., as one or more other isolated execution environments). When associated with the same cloud service account a user with access to the respective cloud service account may have administrative controls over the data intake and query system 102 and the external data system 512, enabling the user to activate/disable and/or add/remove/update components to or features of the data intake and query system 102 and/or the external data system 512, despite the different nature and/or query languages used.

In certain cases, some components of the external data system 512A may be instantiated in the same cloud-based environment and/or associated with the same cloud service account as some or all of the components of the data intake and query system 102, and other components of the external data system 512A may be associated with a different cloud service account in the same (or different) cloud-based environment. For example, a search coordinator (e.g., used to search data in the external data system 512A) and a storage system of the external data system 512A may be instantiated in the same cloud-based environment and associated with the same cloud service account as the data intake and query system 102, while a metadata service and a second storage system (in communication with the search coordinator) associated with the external data system 512A may be associated with a different cloud service account in the same (or different) cloud-based environment as the data intake and query system 102. In certain cases, all of the components of the external data system 512 may be associated with a different cloud service account and/or instantiated in a different cloud-based environment than the data intake and query system 102.

In some cases, components of an external data system 512 instantiated in different cloud services or associated with different cloud service accounts may be referred to as different external data systems 512 or different instances of an external data system 512. Accordingly, in some cases, components of a first external data system 512 may be instantiated in the same cloud-based environment and/or associated with the same cloud service account as the data intake and query system 102, and may be configured to communicate with one or more components of a second external data system 512 associated with a different cloud service account in the same (or different) cloud-based environment as the data intake and query system 102. For example, a search coordinator and a first storage system of a first external data system 512A may be instantiated in the same (or different) cloud-based environment and/or associated with the same (or different) cloud service account as the data intake and query system 102 and may be configured to communicate with a metadata service and a second storage system of a second external data system 512A associated with a different cloud service account in the same (or different) cloud-based environment as the data intake and query system 102.

The data intake and query system 102, host devices 104A-104C, and client computing devices 106A-106C can be similar to the data intake and query system 102, host devices 104, and client computing devices 106, respectively, described herein at least with reference to FIG. 1. In some cases, the host devices 104B and 104C and the client computing devices 106B and 106C are communicatively coupled with their respective external data systems 512A and 512B, but not to the data intake and query system 102. For example, the host device 104C can provide data to the external data system 512B but not to the data intake and query system 102 or the external data system 512A. In certain cases, the host devices 104B and 104C and the client computing devices 106B and 106C are communicatively coupled any one or any combination of the data intake and query system 102 and the external data systems 512. For example, the host device 102C can provide data to any one or any combination of the external data systems 512A, 512B or the data intake and query system 102, and the client computing device 106B can communicate with any one or any combination of the external data systems 512A, 512B or the data intake and query system 102 to perform searches.

The data intake and query system 102 and the external data systems 512 may each independently process and store data obtained from various data sources. For example, as described herein, the data intake and query system 102 may store data in its storage system 116. Similarly, the external data systems 512 may store data in respective storage systems 513A and 513B (individually or collectively referred to as external storage system(s) 513). However, the data intake and query system 102 and external data systems 512 may process and store data differently. For example, as described herein, the data intake and query system 102 may store minimally processed or unprocessed data ("raw data") in its storage system 116. In contrast, the external data systems 512 may store pre-processed data rather than raw data, different types of data, such as trace data and/or metrics, etc., and/or store data in different (e.g., non-compatible formats relative to the data in the data intake and query system 102). Hence, the data intake and query system 102 and the external data systems 512 may operate independent of each other in a big data ecosystem.

The storage system 116 may also be referred to as an internal storage system 116 because the data stored thereon has been processed or passed through the data intake and query system 102 in some form. Conversely, the storage systems 513 of the external data systems 512 may be referred to as external storage systems 513 because the data stored by the external storage systems 513 may not have been processed or passed through the data intake and query system 102. In other words, the data intake and query system 102 may have no control or influence over how data is processed, stored, controlled, or managed by the external data systems 512, even if the external data system 512 is another instance of a data intake and query system 102 with the same architecture as the data intake and query system 102.

Data stored in the internal storage system 116 and external storage systems 513 may be related. For example, an online transaction could generate various forms of data stored in disparate locations and in various formats. The generated data may include payment information, customer information, and information about suppliers, retailers, and the like. Other examples of data generated in a big data ecosystem include application program data, system logs, network packet data, error logs, stack traces, and performance data. The data can also include diagnostic information and many other types of data that can be analyzed to perform local actions, diagnose performance problems, monitor interactions, and derive other insights.

The external data systems 512 can process data, perform requests received from other computing systems, process and execute queries, and perform numerous other computational tasks independent of each other and independent of the data intake and query system 102. For example, the external data system 512A may include a search coordinator that can process and execute queries on data in the external data system 512A.

The external data systems 512 may be implemented in a variety of ways. In certain cases, the external data systems 512 may be implemented as a database or system that is dissimilar to the data intake and query systems 102. For example, the external data system 512A is an example of an external data system implemented as a database or other system with a different architecture, components, or function than the data intake and query systems 102. In certain cases, the external data system 512A stores data in a different format than the data intake and query system 102 and/or uses a different query language to access and process the data stored in the external storage system 513A. For example, the data intake and query system 102 may store raw machine data and apply schema to the data at search time, whereas the external data system 512A may apply schema to the data at ingest time and store structured or semi-structured data. In certain cases, the data intake and query system 102 and the external data system 512B are provided by the same entity, whereas the external data system 512A is provided by a different entity.

The external data system 512A may include any data storage and processing system that may be designed, created, implemented, published, or otherwise made available from an entity that differs from an entity that designed and/or created the data intake and query system 102 or 108. Further, the external data system 512A may use a different query or command language, or a different interface language than the data intake and query system 102 and/or external data system 512B. For example, while the data intake and query system 102 may be a SPLUNK® system that is configured to use the Splunk Processing Language (SPL), the external data system 512A may be an alternative system that uses alternative languages. For instance, the external data system 512A may be or may include a system that implements Amazon Athena or Apache Trino and that uses Structured Query Language (SQL) to query data (e.g., data stored in AWS S3), a system that implements the Elastic Stack® (sometimes referred to as Elasticsearch, Logstash, and Kibana, or the "ELK stack") and that uses a query syntax based on the Lucene® query syntax and/or a JSON-based Elasticsearch Query DSL, a system that implements an Oracle® system and that uses a search syntax based on SQL. In some cases, additional external data system 512 may differ from each other. For example, external data system 512A may be an Elastic Stack® system and another external data system 512 may be an Oracle® system or AWS system. In certain cases, the external data system 512A may not process data. In some such cases, the external data system 512A may be coextensive (i.e., interchangeable) with the corresponding external storage system 513A. For example, the external data system 512A may be implemented as the external storage system 513A that stores data sent to it without processing, etc. In some such cases, data can be retrieved from the external data system 512A or external storage system 513A similar to remotely located storage.

In some cases, one or more external data systems 512 may be implemented as another data intake and query system. For example, the external data system 512B is an example of an external data system implemented as a data intake and query system similar to the data intake and query system 102. In this example, the external data system 512B is described as a secondary data intake and query system 102B because of the manner in which it is used to execute a portion of a query received by the data intake and query system 102. However, it will be understood that in other examples, such as where the secondary data intake and query system 102B receives and executes a query from a client computing device 106B and/or receives a query and requests the data intake and query system 102 to execute a portion of a query, the secondary data intake and query system 102B can be referred to as a (primary) data intake and query system 512B. Moreover, when the external data system 512B is implemented as a data intake and query system, the external storage system 513B can be implemented as an instance of a storage system 116. For example, different divisions of the same company may each use separate and independent data intake and query systems 102, 512B to ingest, store, and search their respective data. As such, the different and independent data intake and query systems 102, 512B may not have control over each other or over the data managed by another data intake and query system.

It should be understood that the number and type of external data systems 512 are not limited by the examples FIG. 5A. The environment 500 can have any number of external data systems 512 that can communicate with the data intake and query system 102. Moreover, in some cases, at least some of the external data systems 512 may communicate with other external data systems in addition to, or instead of, the data intake and query system 102.

Despite the independent and separate nature of the data intake and query system 102 and the external data systems 512, it may be beneficial for the data intake and query system 102 to communicate with and receive and process data from one or more external data systems 512, as part of executing a query. For example, a user of the data intake and query system 102 may want to analyze data managed by the external data system 512B or correlate data from the data intake and query system 102 and the external system 512B. Such queries may result in the correlation of additional data and/or may provide additional insights.

For simplicity, reference herein may be made to the data intake and query system 102 communicating with and using the external data system 512 to process and/or execute a query, however, it will be understood that the data intake and query system 102 can communicate with multiple external data systems 512 to execute a query.

As described herein, the data intake and query system 102 may receive a query in a first query language from a client computing device 106. The received query may include one or more query statements and each query statement may include one or more query commands. Each query command may in turn include one or more system query parameters (e.g., query parameters defined by the data intake and query system 102 and/or that maintain their meaning across different users or instances of the data intake and query system 102, such as command identifiers or the names of the command) and/or one or more user query parameters (e.g., query parameters that may be defined/selected by a user and/or the user's data, such as an argument or variable for a function, a field name for a field in data associated with the user, and/or an identifier for a dataset associated with the user, etc.). For example, the query command "from main" includes a system query parameter "from," that maintains its meaning across users and instances of the data intake and query system 102 and a user query parameter "main," that refers to different data depending on the user, etc.

The system query parameters may refer to query parameters that are defined by the data intake and query system 102, such as query commands or functions, like "from," "|," "count," "avg," or "by," and/or maintain their meaning across tenants. For example, the manner in which the data intake and query system 102 interprets "from," "|," "stats," "avg," and "by," is determined by the data intake and query system 102 and maintains its meaning across different users, accounts, or tenants. In some cases, system query parameters may include different types or subtypes, such as functions, keyword commands (including clauses), etc.

The user query parameters may refer to query parameters that are defined by the user or the user's data, such as the name of search terms in the query, the time range of the query, field names, keywords, dataset identifiers, etc. In some cases, the user query parameters are user, account, or tenant specific such that a user query parameter for one user, account, or tenant may have a different meaning (or no meaning at all) or apply to different data for another user, account, or tenant. For example, even if two accounts have a "main" dataset, the data associated with the "main" dataset for one account is different from the data associated with the "main" dataset from the other tenant. Accordingly, the meaning or what is referenced by the user query parameters can be user or data specific and may not be universally applicable to different users, accounts, or tenants. In some cases, user query parameters may include subtypes, such as dataset, field, and keyword tokens.

As described herein, upon receipt of a query by the data intake and query system 102, the data intake and query system 102 can parse the query and determine that the query involves one or more external data systems 512, is a federated query, or should be forwarded to external data systems 512. The data intake and query system 102 can generate one or more subqueries and/or distribute the subqueries to the external data systems 512 involved in the query with instructions to return the results of the relative subqueries to the data intake and query system 102.

In some cases, the data intake and query system 102 can generate the one or more subqueries by translating the query from one query language to another query language. As described herein, the data intake and query system 102 may operate using one query language while an external data system 512 may operate using a different query language. As such, a query received by the data intake and query system 102 may not function or return results if sent to the external data system 512 without translation.

In translating the query from one query language to another, the data intake and query system 102 can translate the query statements from one query language to another. This may include translating one or more query commands (or system query parameters of a query command) of a query statement into one or more query commands (or system query parameters) of the second query language. This may also include translating one or more user query parameters (e.g., a dataset identifier) understood by the data intake and query system 102 to one or more user query parameters understood by the external data system 512.

In some cases, a query command in a first query language may have a corresponding query command in a second query language such that the system query parameter in the first query language can be replaced by the corresponding system query parameter in the second query language. In some such cases, one query command in the first query language may be directly (or statically) translated into one query command in the second query language and/or one system query parameter in the first query language may be directly (or statically) translated into one system query parameter in the second query language.

In certain cases, however, a query command in a first query language may not have a corresponding system query parameter in the second query language. As such, the data intake and query system 102 may indirectly (or dynamically) generate multiple query statements, query commands, system query parameters, and/or multiple lines of a query in the second query language to achieve a function similar to the function of the query command in the first query language. In some cases where a query command in a first query language does not have a corresponding query command in the second query language, the data intake and query system 102 may use one or more user query parameters (e.g., a user query parameter in or associated with the query command being translated) to determine which and how many query commands and/or system query parameters to generate in the second query language.

In some cases, a first query may include a time-based query command that relates to organizing, sorting, or selecting events based on an associated time or timestamp. The time-based query command may include a time-based system query parameter that identifies the time-based query command and one or more user query parameters (or variables) that indicate a time or time range by which events are to be sorted and/or selected. The time-based query command may not have a corresponding query command in the second query language. As such, the data intake and query system 102 may indirectly translate the time-based query command into multiple query commands or multiple query statements in the second query language, or translate the time-based system query parameter of the time-based query command into multiple system query parameters. Accordingly, there may be a one-to-many correspondence between the time-based system query parameter and the system query parameters in the second language. In addition, in certain cases, the resulting query command(s) in the second query language may include multiple user query parameters that were not included in the first query. In some such cases, the added user query parameters in the resulting query command may be unrelated to (e.g., not generated from) the user query parameter in the first query. In certain cases, the added user query parameters in the resulting query command may be related to (e.g., generated using or based on) the user query parameter in the first query.

In some cases, the time-based query command may be associated with a time zone, such as the time zone corresponding to a location of a computing device that submitted the query or a time zone to be used as a standard or base time for displaying query results. In some cases, the time zone is automatically associated with the time-based query command based on, for example, a location of a computing device that communicated the first query to the data intake and query system 102, a location of the data intake and query system 102, and/or a default location. In certain cases, the time zone is associated with the time-based system query parameter based on a user query parameter in the query command (e.g., a user indicating a particular time zone that is to be associated with the time-based query command for at least that query).

In translating the time-based query statement, the data intake and query system 102 may use the user query parameters, time zone, and/or time-based system query parameter to generate one or more query commands, system query parameters, user query parameters, and/or query statements for the second query in the second query language. In certain cases, the user query parameter (e.g., time range or time step) may be used to determine the quantity of query commands generated in the second query language. In some cases, as the range of time increases for a particular unit of time (e.g., moving from one second to three seconds or from one day to five days), the number of query commands, system query parameters and/or user query parameters generated may increase. In addition, a query command indicating how to adjust a time zone of events from the external data system 512 based on the time zone associated with the time-based query command may be included one or more times throughout the second query in the second query language. In some cases, the number of times query commands associated with the time zone are included in the second query language depends on a time range, time step, and/or other user query parameter.

FIG. 5B is a diagram illustrating various non-limiting examples of first query language or pre-translated queries 550A, 550B, 550C, and 550D (individual or collectively referred to as pre-translated queries 550 and/or first query language queries 550) and the second query language or translated queries 552A, 552B, 552C, 552D (also referred to herein as second query language queries 552).

In the illustrated example, first query language query 550A is translated into second query language query 552A, first query language query 550B is translated into second query language query 552B, first query language query 550C is translated into second query language query 550C, and first query language query 550D is translated into second query language query 552D. As described herein, first query language query 550A includes query system parameters "|," "sdselect," "count," "from," "groupby," and "span," and user query parameters "json_custom," "time," and "1d." At least one of the query system parameters corresponds to a time-based query system command (e.g., "span"). In some cases, a user may type the first query language query 550A and/or use a graphical user interface to select one or more parameters of the first query language query 550A. For example, the graphical user interface may enable a user to select a time range for the first query language query 550A (e.g., time span of one day or 1d).

In the illustrated example, in translating the first query language query 550A into second query language query 552A, the data intake and query system 102 identifies query system parameters in the second query language that correspond to the query system parameters for "sdselect" (SELECT), "count" (count(*)), "from" (FROM), and "groupby" (GROUP BY). Accordingly, the data intake and query system 102 may directly (or statically) translate the aforementioned query system parameters from the first query language to the second query language.

Using configuration data or other data associated with the external data system 512, the data intake and query system 102 may also identify a translation of the user query parameter (and dataset identifier) "json_custom" associated with the data intake and query system 102 into a user query parameter associated with the external data system 512 ("allan_json_test3").

In the illustrated example, the data intake and query system 102, however, is unable to identify a corresponding query system parameter or query command for "span." As such, the data intake and query system 102 indirectly (or dynamically) translates the query command and/or generates multiple query commands and system query parameters in the second query language that enables the external data system 512 to process data in a manner similar to the "span" command in the data intake and query system 102. To generate the multiple query commands and system query parameters, the external data system 512 uses one or more user query parameters from the "span" query command and a time zone associated with the first query language query 550A.

Based on the time-based query command, "span=1d," the data intake and query system 102 generates query commands to group events on the same day together. As the second query language does not include such functionality, the data intake and query system 102 dynamically generates a query command to modify a time or timestamp associated with events from the external data system 512A to a day. For example, based on the user query parameter of one day, the generated query command may truncate the hours, minutes, and seconds of the timestamp so that events occurring on the same day end up with the same time stamp (e.g., date_trunc ('day', parse_datetime("time", 'yyyy-MM-dd' 'T' 'HH:mm: ss.SSS')). In the illustrated example, the timestamps are truncated to the day based on the time range of the first query language query 550A indicating a time range in the units of days, however, it will be understood that the timestamps may be modified or truncated according to units of time (e.g., second, hour, week, month, year, etc.) based on the unit of time specified in a first query language query.

In the illustrated example, the first query language query 550A is associated with a 'America/Los_Angeles' time zone. Accordingly, the data intake and query system 102 generates a query command to translate or adjust a time associated with events from the external data system 512 into a time zone associated with the data intake and query system 102 (e.g., AT TIME ZONE 'America/Los_Angeles').

In some cases, to indicate the query parameters in the first query language query 550A to which the generated query commands in the second query language query 552A correspond, the data intake and query system 102 may generate and insert an identifier in the second query language query 552A. In the illustrated example, the data intake and query system 102 generates and inserts the query command "AS 'time'" ("time" being the identifier) to indicate that the preceding query commands (to_unixtime( . . . )) relate to the "time" query parameter in the first query language query 550A and generates/inserts the query command "AS 'count'" ("count" being the identifier) to indicate that the preceding query command (count(*)) relates to the "count" query parameter in the first query language query 550A. In some such cases, the identifiers may be used in subsequent portions of the second query language query 552A to reduce the amount of words used to define the second query language query 552A.

The data intake and query system 102 may also generate one or more query commands to modify a format of the time used in the external data system 512. For example, the format used by the external data system 512 may differ from the format used by the data intake and query system 102. Accordingly, the data intake and query system 102 may generate a query command (e.g., to_unixtime) to modify the time format of events in the external data system 512 to be similar to or conform with the format for the data intake and query system 102. Additional query commands may be generated as part of the query translation to place the second query language query 552A in conformity with one or more syntax or semantic expectations of the external data system 512 and/or to limit a quantity of results received by the external data system 512. For example, the query commands ORDER BY 1 LIMIT 100000 may indicate how results are to be returned and/or limit the number of results returned. In this way, the data intake and query system 102 may control the amount of data received from the external data system 512.

The data intake and query system 102 can combine the query commands generated by the data intake and query system 102 as a translation of the query commands in the first query language query 550A. For example, the data intake and query system 102 may combine query commands associated with the time zone and query commands associated with grouping events based on time into a larger or nested query command. The generated (or translated) query commands may be inserted into the second query language query 552A one or more times. In some cases, the generated query commands are inserted as an argument in one or more query commands of the second query language query 552A. In the illustrated example, the generated commands are inserted multiple times as arguments in the SELECT query command and as an argument in the GROUP BY query command. In some such cases, the generated commands may be inserted in locations of the second query language query that deal with how to treat/process individual events such that the transformations made as a result of the generated commands are consistently applied throughout the second query language query 552A.

With continued reference to FIG. 5B, the data intake and query system 102 may translate the first query language query 550B into the second query language query 552B in a similar manner as that described above with reference to the translation of the first query language query 550A to the second query language query 552A. For example, the data intake and query system 102 may identify the query commands in the first query language query 550B that have a corresponding query command in the second query language, and translate the query commands in the first query language query 550B based on the identified corresponding query command. Similarly, the data intake and query system 102 may use a configuration file, lookup table or other data structure to translate user query parameters understood by the data intake and query system 102 into user query parameters understood by the external data system 512.

In addition, the data intake and query system 102 may identify query commands in the first query language query 550B that do not have a corresponding query commend in the second query language, such as the time-based query command span=3d. For those query commands, the data intake and query system 102 may use one or more user query parameters (e.g., span of 3 days) and/or one or more time zones associated with the first query language query 550B to dynamically or indirectly generate query commands in the second query language that may be used to perform functions similar to the respective query command.

Comparing first query language query 550A to first query language query 550B, the queries are similar except that the time range (user query parameter) for the "span" query command has increased from one day to three days (moving from one unit of time to multiple units of time). Based on the increased time range, the data intake and query system 102 may generate additional query commands that enable the external data system 512 to group events within three days of each other together. The additional query commands may include copies of the query command generated when the span was one and inserted in different locations to group events within the three-day window. As noted above, the generated commands may be inserted in locations of the second query language query that deal with how to treat/process individual events such that the transformations made as a result of the generated commands are consistently applied throughout the second query language query 552B.

In addition, the generated query commands can modify the time of the events based on a time zone associated with the first query language query 550B and/or based on a time format used by the data intake and query system 102. The generated query commands may be inserted as an argument to one or more query commands in the second query language query 552B that have a corresponding query command in the first query language query 550B (e.g., "SELECT" and "GROUP BY").

With reference to first query language query 550C, the data intake and query system 102 translates the first query language query 550C into second query language query 552C. Similar to the aforementioned system queries 550, the data intake and query system 102 may identify query commands (or system query parameters) that have a corresponding query command in the second query language (e.g., "sdselect," "from") and query commands that do not have a corresponding query command in the second query language (e.g., "earliest(*)"), and identify user query parameters for the second query language query 552C ("allan_json_test3" from "json_custom"). For query commands that do not have a corresponding query command in the second query language, such as the time-based query command "earliest(host)," the data intake and query system 102 may generate one or more query commands, system query parameters, and/or user query parameters to include in the second query language query 552C.

In the illustrated example, the data intake and query system 102 generates multiple query commands, system query parameters, and user query parameters in the second query language that enable the external data system 512 to perform functions similar to the query command "earliest (host)," which may include selecting the earliest event (from a set of events) with a field value for the field "host." In the illustrated example, the 102 generates the following query commands, system query parameters, and user query parameters based on the time-based query command in the first query language query 550C that does not have a corresponding query command in the second query language: "DISTINCT last_value("host") OVER (ORDER BY "time" DESC RANGE BETWEEN UNBOUNDED PRECEDING AND UNBOUNDED FOLLOWING) AS "earliest(host")" FROM "allan_json_test3."

In translating the first query language query 550C into second query language query 552C, the data intake and query system 102 may include additional query commands as described herein. For example, the data intake and query system 102 may include one or more query commands to identify a relationship between query parameters in the first query language query 550C and generated query commands in the second query language query 552C (e.g., "AS 'earliest (host)'"). As another example, the data intake and query system 102 may include one or more query commands to limit the quantity of results that can be received from external data system 512 (e.g., using the query command LIMIT 100000).

With reference to first query language query 550D, the data intake and query system 102 translates the first query language query 550D into second query language query 552D. Similar to the aforementioned first query language query 550C, the data intake and query system 102 may identify query commands (or system query parameters) that have a corresponding query command in the second query language (e.g., "sdselect," "from," "count") and query commands that do not have a corresponding query command in the second query language (e.g., "earliest(*)"), and identify user query parameters for the second query language query 552D ("allan_json_test3" from "json_custom"). For query commands that do not have a corresponding query command in the second query language, such as the time-based query command "earliest(host)," the data intake and query system 102 may generate one or more query commands, system query parameters, and/or user query parameters to include in the second query language query 552D.

In the illustrated example, the data intake and query system 102 generates multiple query commands, system query parameters, and user query parameters in the second query language that enable the external data system 512 to perform functions similar to the query commands "earliest (host)," which may include selecting the earliest event (from a set of events) with a field value for the field "host." Moreover (and different from first query language query 550C), as the first query language query 550D indicates that results are to be displayed based on multiple criteria (e.g., counts and earliest host), the data intake and query system 102 may include the generated query commands in multiple locations of the generated second query language query 552D. In some cases, the generated commands may be inserted in locations of the second query language query that deal with how to treat/process events such that the transformations made or processing done as a result of the generated commands are consistently applied throughout the second query language query 552B.

Similar to the description herein with reference to second query language query 552C, the data intake and query system 102 may include additional query commands to indicate relationships between query parameters of the first query language query 550D and generated query commands of second query language query 552D (e.g., "AS 'count (host)'" and "AS 'earliest(host)'"), format the data, and/or to limit the quantity of results that can be received from the external data system 512 (e.g., "LIMIT 100000").

The external data systems can process the second query language queries 552A-552D similar to queries received from a client computing device 106. Results of the second query language queries 552A-552D can be returned to the data intake and query system 102 for further processing and/or correlation and/or stored in a storage system accessible by the data intake and query system 102. For example, the external data system 512 may be unable to perform parallel reads of the data and/or communicate the results in a parallel way. In some such cases, the external data system 512 may store the results in a storage system accessible to the data intake and query system 102. The data intake and query system 102 may determine a quantity of records in the results, generate one or more result readers (e.g., as separate threads or processes) based on the quantity of records, and read the results concurrently using the result readers. In this way, the data intake and query system 102 may obtain the results of the second query language query in parallel, thereby reducing processing time of the query.

It will be understood that the first query language queries 550 are examples and that any number or variety of queries can be generated by a user. In some cases, the user may use a graphical user interface to generate the queries. For example, a user may interact with one or more display objects of the GUI to generate the query. In some cases, the GUI may enable a user to select a time window using a time range picker. In some such cases, the system may generate a query in the second query language based on the selections in the GUI. In certain cases, the system may generate the query in the first query language and then translate into the second query language. In some cases, the system may generate the query in the second query language directly from the selections in the GUI.

Figure 6:
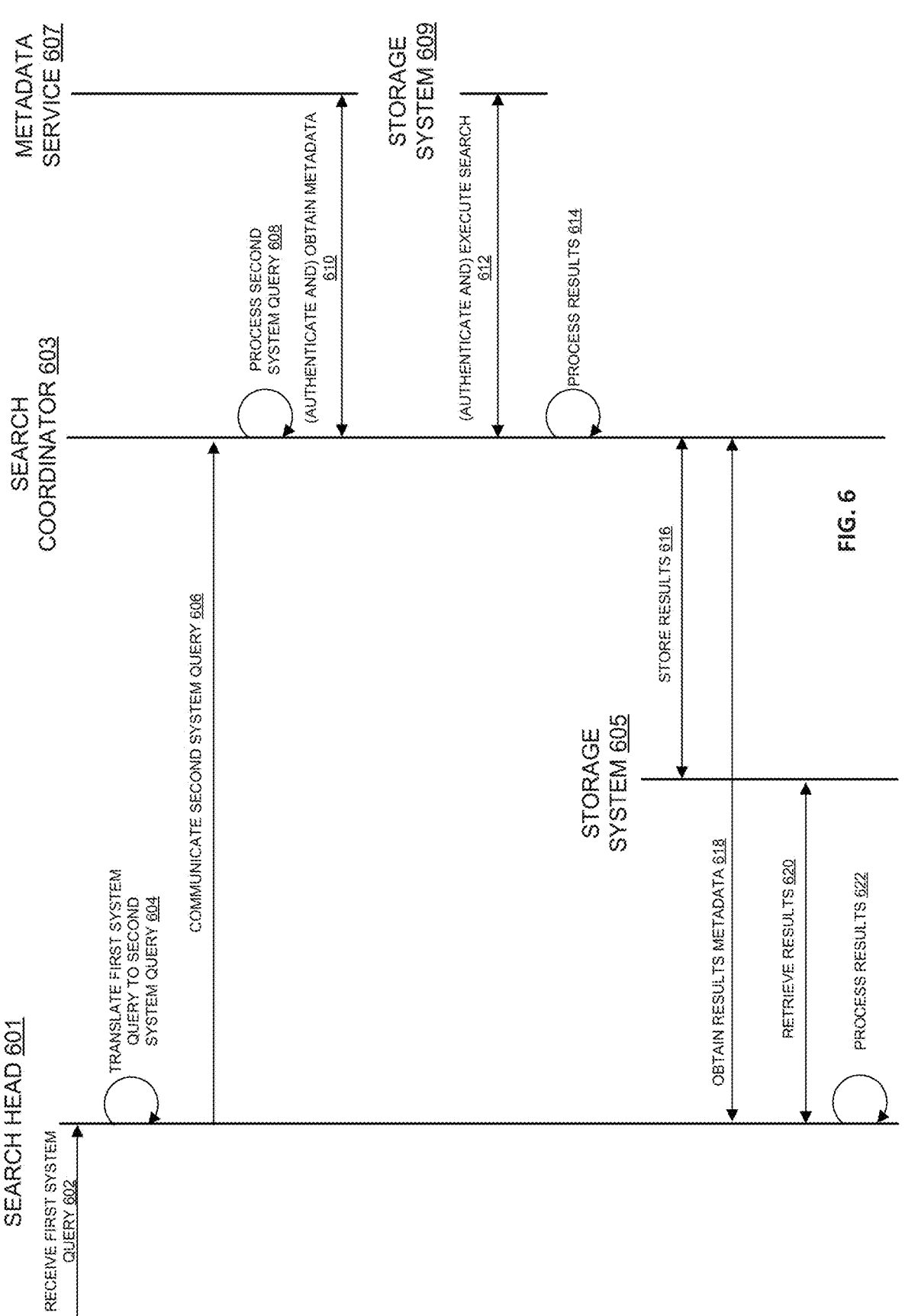
FIG. 6 is a data flow diagram illustrating an example of communications between various components described herein to translate a first query language query into a second query language query for an external data system and process results from the external data system

FIG. 6 is a data flow diagram illustrating an example of communications between various components described herein to translate a first query language query into a second query language query for an external data system and process results from the external data system. Although described as being performed by particular components, it will be understood that one or more components of a data intake and query system can perform the described functions. In the illustrated example, communications are made between one or more of a search head 601 of a data intake and query system 102, a search coordinator 603 and first storage system 605 associated with a first external data system 512, and a metadata service 607 and storage system 609 associated with a second external data system 512. It will be understood, however, that the search coordinator

603, first storage system 605, metadata service 607, and/or second storage system 609 may form part of the same external data system 512 and/or the first storage system 605 and/or second storage system 609 may be part of the same storage system.

As described herein, the data intake and query system 102 may be distinct in type, architecture, components, and query language used from the first and second external data systems 512. For example, the data intake and query system 102 may use a query language that is different from the query language used by the first and second external data systems 512. Moreover, the data intake and query system 102 may be provided by a different company than the first and second external data systems 512. Despite the differences between the data intake and query system 102 and the first and second external data systems 512, one or more components of the first or second external data system 512 may be instantiated in a shared computing resource or cloud-based environment (e.g., as one or more isolated execution environments), such as Amazon AWS or Google Cloud Platform, with one or more components of the data intake and query system 102 (e.g., as one or more other isolated execution environments). For example, the search head 601 may be instantiated in a shared computing resource or cloud-based environment (e.g., as one or more isolated execution environments) associated with first cloud service account, and the search coordinator 603 (e.g., as one or more other isolated execution environments) and the first storage system 605 may be instantiated in the same cloud-based environment provided by the same cloud service provider and associated with the same cloud service account. Accordingly, a user of the data intake and query system 102 may also have authorization to access/use the search coordinator 603. In some cases, the search head 601 may be instantiated as a search head of one or more products offered by Splunk Inc., the search coordinator 603 may be instantiated as an instance of the AWS Athena or Google BigQuery service, and the first storage system may be instantiated in AWS S3, Google Cloud Storage, or the like.

The metadata service 607 and second storage system 609 may be instantiated in a shared computing resource or cloud-based environment as part of the second external data system 512. In some cases, the metadata service 607 may be instantiated as an instance of the AWS Glue or Google Cloud Dataflow service and the second storage system 609 may be instantiated using AWS S3, Google Cloud Storage, or the like. The second external data system 512 may be different from the first external data system 512 in that it may be associated with a different cloud service account of the same cloud service provider as that of the first external data system 512 and/or instantiated in a different cloud-based environment by a different cloud service provider. While the second external data system 512 may be different (or at least associated with a different cloud service account) as the first external data system 512, the first external data system 512 and second external data system 512 may understand and/or use a same query language to execute queries on respective data. In some cases, the first storage system 605 and second storage system 609 may be different instances of the same type of storage system. For example, the first storage system 605 and second storage system 609 may include different portions of an AWS S3 or other cloud storage system.

Accordingly, in some cases, the search head 601 may form part of a data intake and query system 102 associated with a first cloud service account of a first cloud service provider, the search coordinator 603 and first storage system 605 may form part of an external data system 512 associated with the first cloud service account of the first cloud service provider, and the metadata service 607 and storage system 609 may form part of the same external data system 512 or a different external data system 512 associated with a second (and different) cloud service account of the first cloud service provider (or a second cloud service provider). Accordingly, a user with access to the search head 601 may also have authorized access to the search coordinator 603 and/or first storage system 605 but may not have administrative access to the metadata service 607 or storage system 609. Moreover, the query language used to query data associated with the system data intake and query system 102 may be different than the query language used to query data associated with the search coordinator 603, metadata service 607, and storage system 609.

In certain cases, the search coordinator 603 and first storage system 605 may be associated with a different cloud service account than the search head 601 and/or instantiated in a different cloud-based environment. In some such cases, to communicate with the search coordinator, the search head may authenticate itself with the search coordinator (in a manner similar to the way in which the search coordinator authenticates itself with a metadata service and/or a storage system, as described herein). In some such cases, the search coordinator 603 and/or first storage system 605 may be instantiated with the metadata service 607 and/or second storage system 609 in the same cloud-based system and/or associated with the same client service account. In certain such cases, the first storage system 605 and second storage system 609 may form part of the same storage system.

At 602, the search head 601 receives a first query language query in a first query language from a client computing device. In some cases, the first query language may be SPL. Upon receipt of the first query language query, the search head 601 may initiate a query processing phase to process the first query language query. As part of the query processing phase or processing the first query language query, the search head 601 may parse the first query language query. As described herein, as part of parsing the first query language query, the search head 601 may determine that the first query language query is a multi-system query, or involves data managed by an external data system 512, such as but not limited to a SQL database, shared storage system, like AWS S3 or Google Cloud Storage, etc. that are accessible via a wide area network.

In some cases, the search head 601 can determine that the first query language query is a multi-system or federated query based on a command, function call, or term in the first query language query. For example, the first query language query may include a command that indicates the first query language query is a multi-system query and/or the first query language query may include reference to a set of data in the external data system 512. Based on the identification of a reference to data in an external data system 512, the data intake and query system 102 can determine that the external data system 512 is to be accessed as part of the first query language query and/or that the first query language query is a multi-system or federated query. However, it will be understood that a variety of methods can be used to indicate that a search is a multi-system query.

At 604, based on a determination that the search coordinator 603 uses a different query language, the search head 601 (or other component of the data intake and query system 102) translates the first query language query to a second query language query. In some cases, the search head 601 may determine that the search coordinator 603 uses a different query language based on configuration data associated with the search coordinator 603.

As described herein, the search head 601 may translate the first query language query to the second query language query based on the query syntax or semantics of the first query language query, one or more query commands, user query parameters, system query parameters of the first query language query, and/or a time zone associated with the first query language query.

In some cases, translating the first query language query to the second query language query can include translating user query parameters (or arguments) understood by the data intake and query system 102 to user query parameters (or arguments) understood by the external data system 512, directly translating query commands in the first query language that have a corresponding query command in the second query language (statically, e.g., resulting translation is predetermined based on the system query parameter that is the subject of the query command, based on a one-to-one correspondence of system query parameters and/or based on a lookup table for system query parameters), indirectly translating query commands in the first query language that do not have a corresponding query command in the second query language (dynamically, e.g., resulting translation is not predetermined and/or is based on query parameters other than the system query parameter that is the subject of the query command), adding query parameters to identify query commands in the second query language query that correspond to query commands in the first query language query, adding query parameters to format results in a manner that is accepted by the data intake and query system 102, and/or adding query parameters to limit results received by the external data system 512.

In some cases, the search head 601 translates the query commands in the first query language that do not have a corresponding query command in the second query language based on one or more user query parameters in the query command, the query syntax or semantics (e.g., the placement of the query command relative to other query commands), a time zone associated with the first query language query, etc.

In some cases, a user query parameter that indicates a time range associated with a query command may cause the search head 601 to generate additional query commands. For example, if events are to be grouped together in time ranges larger than a single unit of time (e.g., more than two seconds instead of one second, three days instead of one day, four months instead of one month, etc.), the search head 601 may generate additional query commands in the second query language that causes the external data system 512 to concatenate timestamps associated events to different in a way that enables the external data system 512 to group the events together. A non-limiting example is shown in the second query language query 552B. Moreover, based on a time zone associated with the first query language query (e.g., location of user that generated the query or computer used by user to generate the query, or other time zone, etc.), the search head 601 may generate a query command to reformat the timestamps of events to the time zone associated with the first query language query and/or associated with the search head 601.

In some cases, the resulting dynamically generated query commands in the second query language may be inserted in multiple locations of the second query language query. For example, the dynamically generated query commands may indicate how individual events are to be formatted, interpreted, or processed at different stages of the second query language query. Accordingly, the instructions as to how to format, interpret, or process the individual events may be inserted at different locations of the second query language query that relate to the processing of individual events.

Although reference is made to translating the query, it will be understood that in some cases, the search head 601 translates a portion of the query into the second query language query. For example, the first query language query may include instructions to conduct searches in different locations or across different systems (e.g., within the query system 102 and across one or more external data system 512). In some such cases, some portions of the first query language query may not apply to the external data system 512 associated with the search coordinator 603. Accordingly, the search head 601 may translate portions of the first query language query that are relevant to the search coordinator 603 and communicate the resulting second query language query to the search coordinator 603. Thus, reference to the processing, storage, and retrieval of results of the second query language query may refer to portions of the first query language query received by the search head 601.

At 606, the search head 601 communicates the second query language query in the second query language to a search coordinator associated with the external data system 512. As described herein, the search head 601 may understand queries in the second query language and/or be able to parse/interpret them for execution. Moreover, as described herein, despite the different query languages, the search coordinator 603 may be instantiated in the same cloud-based environment and associated with the same cloud service provider as the data intake and query system 102.

At 608, the search coordinator 604 processes the second query language query. The search coordinator 603 may process the query in a manner similar to the manner in which the search coordinator 603 processes queries that it receives from client computing devices 602. For example, in some cases, the search coordinator 603 may parse the second query language query, identify relevant data to be searched, determine an order of processing steps, and/or generate query execution instructions for one or more components of the external data system 512. In certain cases, from the perspective of the search coordinator 603, the second query language query is similar to other queries that it receives, processes, and executes.

At 610, the search coordinator 603 requests and receives metadata associated with data stored in the second storage system 609 from the metadata service 607. In some cases, the search coordinator 603 may communicate one or more filter criteria to the metadata service 607 and request metadata, such as object identifiers, object sizes, quantity of objects, locations of objects, etc., for data objects that include data that satisfies some or all of the filter criteria (also referred to herein as relevant objects). In certain cases, the search coordinator 603 may request the metadata service 607 to return metadata for some or all objects associated with a particular user, tenant, or directory. In some cases, the search coordinator 603 may use filter criteria to limit the amount of metadata or number of identifiers returned from the metadata service 607 (and correspondingly reduce the amount of data in the second storage system 609 to be searched/processed).

In some cases, the search coordinator 603 may select, identify, or determine the filter criteria by analyzing or parsing the second query language query. As described herein, a second query language query (like a first query language query) may include a variety of search parameters as query filter criteria, such as, but not limited to, fields (e.g., field identifiers), field values, keywords, time, etc. The search coordinator 603 may identify the query filter criteria in any portion of the second query language query. For example, a field identifier may be located at the beginning, middle, or end of the query. Accordingly, the search coordinator 603 can parse the entire second query language query to identify and select the query filter criteria. In some cases, the search coordinator 603 may use a subset of the query filter criteria. For example, the search coordinator 603 may use only the query filter criteria found at the beginning (or middle or end) of the query. The search coordinator 603 may communicate any one or any combination of the query filter criteria to the metadata service 607 with a request to return object identifiers for data objects that include data that satisfies at least a portion of the query filter criteria from the second query language query.

In some cases, the search coordinator 603 may identify and use other information associated with the query as filter criteria. For example, the search coordinator 603 may use the identity of the user that initiated the query, a tenant or account associated with the data to be searched/processed, or other data associated with the query as filter criteria and request object identifiers of objects that include data that satisfies at least a portion of the filter criteria from the second storage system 609.

In response to the request, the search coordinator 603 may receive the object identifiers for the relevant data objects. In some cases, the response can include identifiers for one or more files, folders, directories, data chunks, partitions, buckets, physical locations, or other data object in the second storage system 609 that includes data that satisfies some or all of the filter criteria. In some cases, the search coordinator 603 can receive thousands, millions, or billions of object identifiers (or other metadata), depending on the number of relevant data objects.

As described herein, in some cases the metadata service 607 and search coordinator 603 are associated with different client service accounts, different cloud service providers, and/or different external data systems 512. In some such cases, prior to requesting the metadata, the search coordinator 603 may authenticate itself with the metadata service 607. For example, the search coordinator 603 may send a request to the metadata service 607 with one or more identifiers or tokens that enable the metadata service 607 to authenticate search coordinator 603 to interact with the metadata service 607. In certain cases, prior to the search coordinator 603 interacting with the metadata service 607, a user stores one or more authorizations with the metadata service 607, e.g., in one or more configuration files of the metadata service 607 to authorize search coordinator 603 to interact with metadata service 607.

At 612, the search coordinator 603 executes the search on the data in the second storage system 609 using the metadata obtained from the metadata service 607. As described herein, the metadata may include the location or quantity of objects, manner to access the objects, etc. that enables search coordinator 603 to retrieve the data.

As described herein, in some cases the second storage system 609 and search coordinator 603 are associated with different client service accounts, different cloud service providers, and/or different external data systems 512. In some such cases, prior to requesting the metadata, the search coordinator 603 may authenticate itself with the second storage system 609. For example, the search coordinator 603 may send a request to the second storage system 609 with one or more identifiers or tokens that enable the second storage system 609 to authenticate search coordinator 603 to interact with the second storage system 609. In certain cases, prior to the search coordinator 603 interacting with the second storage system 609, a user stores one or more authorizations with the second storage system 609, e.g., in one or more configuration files of the second storage system 609 to authorize search coordinator 603 to interact with second storage system 609.

At 614, the search coordinator 603 processes the received data according to the second query language query. As described herein, the second query language query can indicate how the search coordinator 603 is to process the data. For example, the second query language query may indicate how to manipulate, transform, reduce, and/or count the data. Accordingly, the search coordinator 603 can process the objects received from the external data system 512 in accordance with the second query language query.

At 616, the search coordinator 603 stores the processed results (or partial query results) in the first storage system 605. As described herein, the first storage system 605 may form part of the same external data system 512 as the search coordinator 603 (e.g., in a cloud-based environment with the same cloud service provider and/or the same cloud service account) and/or the metadata service 607 and second storage system 609. In some cases, the first storage system 605 may store whatever type of data it receives from the search coordinator 603 or other device.

At 618, the search head 601 obtains metadata about the (partial) results from the search coordinator 603. The metadata may include information related to a size (in terms of computer storage) of the (partial) results, a quantity of the (partial) results, a location of the (partial) results in the first storage system 605, etc.

At 620, the search head 601 retrieves the (partial) results from the first storage system 605.

In some cases, the search head 601 uses the metadata obtained from the search coordinator 603 to retrieve the (partial) results from the first storage system 605. For example, the search head 601 may use the location of the (partial) results to request the (partial) results from the first storage system 605.

In some cases, the search head 601 may use the quantity or size of the (partial) results to retrieve them from the first storage system 605. For example, based on the quantity or size of the (partial) results, the search head 601 may generate multiple threads or processes (also referred to herein as results readers) to retrieve the results concurrently or in parallel. The various threads or processes may read the file, directory, or other data structure where the (partial) results are located concurrently. Different threads or processes may process different portions of the file, directory, or other data structure in parallel in order to reduce the amount of time to retrieve the results from the first storage system 605. In this way, the search head 601 may retrieve and process results in less time, thereby reducing an overall search time.

In some cases, the search head 601 may retrieve the (partial) results from the first storage system 605 without using the search coordinator 603 given certain constraints of the search coordinator 603. For example, the search coordinator 603 may be unable to retrieve or communicate the (partial) results to the search head 601 in parallel. As such, the search head 601 may use the metadata from the search coordinator 603 to generate one or more threads or processes to retrieve the (partial) results from the first storage system 605 in parallel.

At 622, the search head 601 processes the results from the search coordinator 603 (and/or other search coordinators 603 or other external data systems 512) according to the first query language query query and communicates the combined results to the user. As described herein, in some cases, the search head 601 may perform one or more reduce functions on the data in the aggregate. For example, the search head 601 can determine an average or other parameters that uses the results from some or all of the results from the search coordinator 603.

Fewer, more, or different steps can be performed. In addition, the order of the steps can be changed and/or one or more steps can be performed concurrently.

Although illustrated as communicating with one search coordinator 603, it will be understood that the search head 601 may communicate with multiple search coordinator 603 to execute a query. In some cases, the search head 601 may translate the first query language query into multiple different query language depending on the search coordinator 603 that is to execute the particular query. For example, the search head 601 may translate the first query language query into the second query language query for the search coordinator 603 and translate the first query language query into a second query language query for a second search coordinator 603 that uses a different query language. Moreover, if a search coordinator 603 does not use a different query language, the search head 601 may forward the first query language query as is and/or add certain query commands for formatting or data limiting purposes, etc. Accordingly, the search head 601 may generate multiple translations of the first query language query and communicate the translated queries to different search coordinator 603 for execution. The search head 601 may receive or retrieve the results and combine them according to the first query language query.

Figure 7:
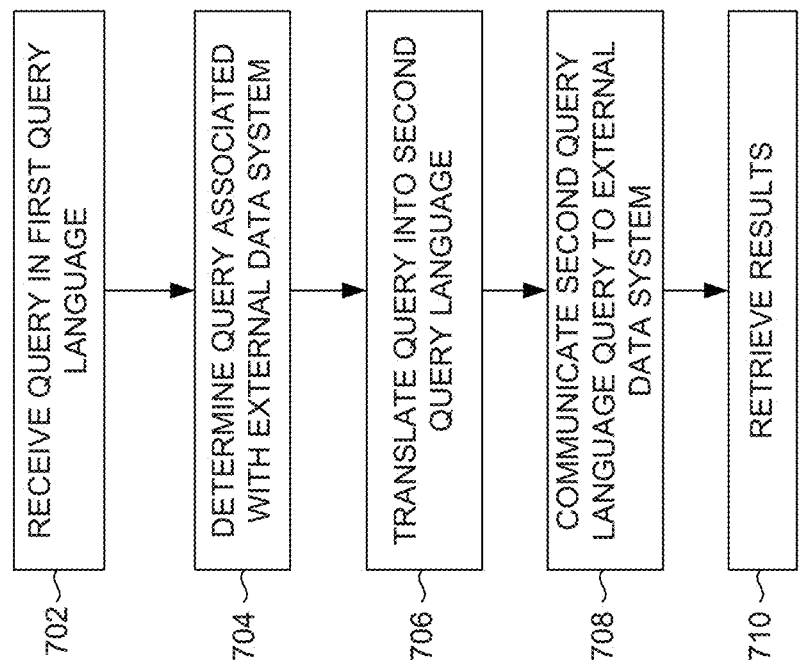
FIG. 7 is a flow diagram illustrative of an example of a routine implemented by a search head of a data intake and query system to translate and initiate execution of a query that references data in an external data system.

FIG. 7 is a flow diagram illustrative of an example of a routine 700 implemented by a search head of a data intake and query system 102 to translate and initiate execution of a query that references data in an external data system, such as external data system 512. Although described as being implemented by a search head, it will be understood that one or more elements outlined for routine 700 can be implemented by one or more computing devices/components that are associated with the data intake and query system, such as a search head, indexing node, and/or search node, etc. Thus, the following illustrative example should not be construed as limiting.

At 702, the search head receives a first query. As described herein, the search head may receive a query via one or more networks from a client computing device. The first query may identify a set of data and a manner of processing the set of data. As described herein, the first query may be in a first query language that is understood by the search head and may include one or more time-based query commands related to the processing of events based on time (e.g., grouping events based on a time range, selecting events based on a timestamp associated with the events, etc.). The first query may include one or more additional query commands, user query parameters, and/or system query parameters.

In some cases, the search head may be implemented in an on-prem, in a cloud-based environment, and/or as an isolated execution environment. The search head may also be associated with a system account, such as a cloud service account of a cloud service provider.

At block 704, the search head determines that the query is associated with an external data system. As described herein, the search head may parse the query as part of a query processing phase. In parsing the query, the search head may determine that the query is associated with an external data system and/or that at least a portion of the data to be searched is located in or accessible via the external data system. In some cases, the search head can determine that (at least a portion of the) data for the query resides in the external data system based on one or more query parameters. The query parameters may include an identifier for the external data system or a reference to an identifier for the external data system. For example, the search head may identify a reference to the external data system in the query, a reference to a data set of the external data system in the query, and/or use a configuration file to determine that a dataset identified in the query is accessible via the external data system. The search head may also determine that the external data system uses and/or understands a different query language than the search head. The search head may determine that the external data system uses a different query language based on configuration data of the external data system, by communicating with the external data system and/or other information regarding the external data system.

As the search head parses the first query, it may also identify various parts of the first query, such as but not limited to query commands, user query parameters, system query parameters, etc.

At block 706, the search head translates the query to the second query language. As described herein, in some cases, the search head may perform a direct (or static) or indirect (or dynamic) translation of query commands and/or system query parameters. In some cases, the search head may perform a direct translation of a query command based on a determination that the second query language includes a query command that provides similar functionality. For example, if the first query language includes a system query parameter that indicates how results are to be grouped (e.g., "groupby") and second query language includes a command with similar functionality e.g., "group by"), the search head may perform a direct translation of "groupby" in the first query language to "group by" in the second query language. Similarly, if the first query language and the second query language include a "from" command that is used to identify a dataset from which data is to be obtained, the search head may perform a direct translation of the "from" in the first query language to the "from" in the second query language. In some cases, to effectuate a direct (or static) translation, the search head may use a lookup table to determine the system query identifier in the second query language that is to replace the system query parameter in the first query language.

In certain cases, a query command may have similar functionality but a different syntax. For example, arguments for a query command in the first query language may be in a first order (or before) the system query parameter, whereas arguments for the corresponding query command in the second query language may be in a different order (or after) the system query parameter. A lookup table or other data structure may be used to effectuate a direct (or static) translation in such circumstances.

In certain cases, the search head may perform an indirect (or dynamic) translation of a query command based on a determination that the second query language does not include a query command that provides similar functionality. In performing an indirect translation of a query command, the search head may use one or more user query parameters, surrounding query commands, syntax or semantics of the query, and/or a time zone to determine how to indirectly translate the query command. One example of this is show in the first query language query 550B where "span=3d" does not have a direct translation into SQL. Another example is in first query language query 550C, where "earliest( )" does not have a direct translation in SQL. One example of this is show in the first query language query 550B where "span=3d" does not have a direct translation into SQL. Another example is in first query language query 550C, where "earliest( )" does not have a direct translation in SQL.

As described herein, based on the user query parameter associated with the query command, the search head may generate query commands in the second query language. In some cases, based on a user query parameter for a time range that is greater than one unit of time (e.g., more than one second, one minute, one hour, one day, one week, one month, etc.), the search head may insert the generated query command(s) in multiple locations of the second query language query and/or generate additional query commands to group events by time in accordance with the indicated time range as described herein at least in reference to second query language query 552B of FIG. 5B. In some cases, the generated query commands are inserted for each time a reference to processing events is included in the second query language query.

Similarly, based on a time zone associated with the query, the search head may generate a query command to adjust the time zone of events. Based on a user query parameter, such as a time range, time step, etc., the search head may copy the query command associated with the time zone multiple times throughout the second query language query as described herein at least in reference to second query language query 552B of FIG. 5B.

The search head may indirectly translate the query command based on the location of the query command relative to other query commands (e.g., the syntax or semantics of the first query language query). For example, if the query command is one or multiple argument for another query command, the search head may copy the indirectly translated query command in the second query language multiple times in the second query language query, as described at least in reference to second query language query 552D of FIG. 5B.

In some cases, the search head may also translate user query parameters or identifiers understood or interpretable by the search head to user query parameters or identifiers understood or interpretable by the search head. For example, the search head may modify a dataset identifier of field identifier from a dataset identifier or field identifier known by the search head to a dataset identifier or field identifier known by the external data system. In some cases, the search head may translate the user query parameters based on configuration data associated with the external data system. The configuration data may be stored in a configuration file accessible by the search head.

As part of the translation, the search head may generate one or more query commands to format data in a particular way and/to limit the results generated by (or received from) the external data system.

At block 708, the search head communicates the translated query or second query language query to a search coordinator of the external data system. As described herein, the search coordinator may not understand or be able to interpret queries in the first query language and may be able to interpret queries in the second query language.

As described herein, in some cases, the search coordinator is instantiated in a cloud-based environment and associated with the same cloud service account as the search head. In some such cases, an administrator of the search head may also be authorized to administer the search coordinator.

In certain cases, the search coordinator is associated with a different cloud service account and/or is instantiated in a different cloud-based environment. In some such cases, to communicate with the search coordinator, the search head may authenticate itself with the search coordinator (in a manner similar to the way in which the search coordinator authenticates itself with a metadata service and/or a storage system, as described herein).

As described herein, the search coordinator may execute the second query language query. In executing the second query language query, the search coordinator may authenticate itself with one or more components of the external data system or another external data system (e.g., depending on how the search coordinator is implemented relative to the storage system and/or metadata service), retrieve and process data from a first storage system based on the second query language query, and store results of the second query language query (or partial results of the original query) in a second storage system. As described herein, the first and second storage system may be unrelated storage systems (e.g., one in the cloud and one on-prem) or instantiated in different cloud-based environments (e.g., one in AWS S3 and another in Microsoft Azure or Google Cloud Storage), different portions of a cloud-based storage system, such as AWS S3 or Google Cloud Storage, or may be implemented as different portions of the same storage system (e.g., different directories, etc.).

At block 710, the search head retrieves the (partial) results generated by the search coordinator. As described herein, in some cases, the search head may request metadata associated with the results of the second query language query from the search coordinator and/or the search coordinator may automatically provide the metadata to the search head. The metadata may include a location of the search results and/or a quantity of the search results. In some cases, the search head retrieves the results using the metadata. For example, the search head may use the location of the search results to retrieve them and uses a quantity to generate one or more threads or processes to read the results in parallel.

It will be understood that fewer, more, or different blocks can be used as part of the routine 700, or the blocks can be performed concurrently or in a different order. For example, the search head may further process the results from the search coordinator, combine the results with results from other external data system and/or from internal data processed by the data intake and query system 102. Moreover, the search head may send the further processed results or combined results to a client computing device.

FIG. 8 is a flow diagram illustrative of an example of a routine 800 implemented by a computing device of the data intake and query system 102 to retrieve (partial) results generated by an external data system. Although described as being implemented by a search head, it will be understood that one or more elements outlined for routine 800 can be implemented by one or more computing devices/components that are associated with the data intake and query system, such as a search head, indexing node, and/or search node, etc. Thus, the following illustrative example should not be construed as limiting.

At 802, the search head receives a query in a first query language, as described herein at least with reference to block 702 of FIG. 7

At block 804, the search head determines the query is associated with an external data system, as described herein at least with block 704 of FIG. 7.

At block 806, the search head translates the query from the first query language to a second query language as described herein at least with reference to FIG. 706 of FIG. 7.

At block 808, the search head communicates the second query language query to the external data system, as described herein at least with reference to block 708 of FIG. 7.

At block 810, the search head determines a location of the (partial) results generated by the external data system. The search head may determine the location of the results generated by the external data system in a variety of ways. In some cases, the search head may request metadata and/or a location of the results from the search coordinator. In certain cases, the search coordinator may provide the metadata and/or location to the search head automatically (e.g., as part of informing the search head that the query has been completed). In certain cases, the results may be stored in a predetermined location known by the search head.

At block 812, the search head determines a quantity of results. The search head may determine the quantity of results in a variety of ways, similar to the determination of the location of the results. In some cases, the search head may request metadata and/or information regarding the quantity of the results from the search coordinator. In certain cases, the search coordinator may provide the metadata and/or location to the search coordinator automatically (e.g., as part of informing the search head that the query has been completed). In certain cases, the search read requests or receives metadata associated with the query from the search coordinator. The metadata may include information regarding the location of the search results and the quantity.

At block 814, the search head generates one or more results readers based on the quantity of results. As described herein, the search coordinator may be unable to perform a parallel read of the query results in the storage system. This may significantly increase the time used to read results of the second query language query (if the search coordinator is used). To address this issue, the search head may retrieve the results from the storage system (e.g., without involving the search coordinator). The search head may generate one or more threads or processes to read the results concurrently or in parallel from the storage system. The search head may generate the results readers based on the determined quantity of results. In some cases, for each threshold number of results, the search head may generate an additional results reader.

At block 816, the search head retrieves the results using the generated results readers. As described herein, the results readers may reach out to the storage system in parallel to read the results. In some cases, the query results may be located in a particular file or directory. In reading the results in parallel, the different results readers may block access to a portion of a file that they are reading. In addition, the results readers and/or search head may track which portions of the file or directory have been read to avoid duplicate reads of the same data.

As described herein, the external data system may store the results in a storage system associated with the external data system. In some cases, the storage system is instantiated in the same cloud-based environment and/or associated with the same cloud service account as the search head. In some such cases, the search head may be able to retrieve the results without additional authentication protocols from the storage system. In certain cases, the search head may be associated with a different cloud service account and/or instantiated in a different cloud-based environment. In some such cases, the search head may perform one or more authentication steps to access the results.

It will be understood that fewer, more, or different blocks may be used as part of the routine 800, or the blocks can be performed concurrently or in a different order. For example, in some cases, the search head may concurrently determine the location and the quantity of the (partial) results.

7.0. Terminology

Computer programs typically comprise one or more instructions set at various times in various memory devices of a computing device, which, when read and executed by at least one processor, will cause a computing device to execute functions involving the disclosed techniques. In some cases, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such examples may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective examples may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain cases include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively.

The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain cases require at least one of X, at least one of Y and at least one of Z to each be present. Further, use of the phrase "at least one of X, Y or Z" as used in general is to convey that an item, term, etc. may be either X, Y or Z, or any combination thereof.

In some cases, certain operations, acts, events, or functions of any of the algorithms described herein can be performed in a different sequence, can be added, merged, or left out altogether (e.g., not all are necessary for the practice of the algorithms). In certain cases, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some cases the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:

receiving, at a computing device of a first query system, a first query in a first query language, the first query identifying a set of data and a manner of processing the set of data, wherein the first query includes a set of commands;

processing the first query to determine the set of data includes a dataset residing in a shared storage system and accessible via a second query system using a second query language that is different from the first query language;

translating the first query into a second query in the second query language by:

identifying a first query command in the first query language that has a corresponding query command in the second query language, translating the first query command in the first query language to the second query language based on the first query command, identifying a second query command in the first query language for which no corresponding query command exists in the second query language, and generating a new query command in the second query language that performs functions similar to the second query command in the first query language; and communicating the second query to a search coordinator of the second query system, wherein the search coordinator executes the second query on the dataset and generates search results.

2. The method of claim 1 further comprising:

determining a location of the search results;

determining a quantity of the search results;

generating a plurality of results readers based on the determined quantity of the search results;

concurrently retrieving the search results from the determined location using the generated plurality of results readers;

processing the search results to determine a set of search results; and communicating the set of search results to a second computing device associated with a user.

3. The method of claim 2, wherein processing the search results comprises changing a format of the search results to a second format to generate the set of search results, wherein communicating the set of search results comprises communicating the set of search results in the second format.

4. The method of claim 2, wherein processing the search results comprises combining the search results with additional search results received from a third query system to determine the set of search results.

5. The method of claim 1, wherein the first query system and the search coordinator of the second query system are instantiated in a shared computing resource environment of a cloud service provider and are associated with a first cloud service account of the cloud service provider, and wherein the dataset stored in a first location comprises a portion of the shared storage system of the cloud service provider and is associated with a second cloud service account of the cloud service provider.

6. The method of claim 1, wherein the first query system and the search coordinator of the second query system are instantiated in a shared computing resource environment of a cloud service provider and are associated with a first cloud service account of the cloud service provider, wherein the dataset stored in a first location comprises a first storage system of the cloud service provider and is associated with a second cloud service account of the cloud service provider.

7. The method of claim 1, wherein generating the new query command in the second query language comprises generating one or more query statements, query commands, system query parameters, lines of a query, or a combination thereof, in the second query language.

8. The method of claim 1, wherein generating the new query command in the second query language comprises using one or more user query parameters to determine which and how many query commands or system query parameters to generate in the second query language.

9. The method of claim 1, wherein the second query command in the first query language comprises a time-based query command related to organizing, sorting, and/or selecting events based on an associated time or timestamp.

10. Non-transitory computer-readable media including computer-executable instructions that, when executed by a computing device of a first query system, cause the computing device to:

receive, at the computing device of the first query system, a first query in a first query language, the first query identifying a set of data and a manner of processing the set of data, wherein the first query includes a set of commands;

process the first query to determine the set of data includes a dataset residing in a shared storage system and accessible via a second query system using a second query language that is different from the first query language;

translate the first query into a second query in the second query language by:

identifying a first query command in the first query language that has a corresponding query command in the second query language, translating the first query command in the first query language to the second query language based on the first query command, identifying a second query command in the first query language for which no corresponding query command exists in the second query language, and generating a new query command in the second query language that performs functions similar to the second query command in the first query language; and communicate the second query to a search coordinator of the second query system, wherein the search coordinator executes the second query on the dataset and generates search results.

11. The non-transitory computer-readable media of claim 10, wherein the second query command in the first query language comprises a time-based query command related to organizing, sorting, and/or selecting events based on an associated time or timestamp.

12. A computing device of a first query system, the computing device comprising:

a data store; and one or more processors, the one or more processors configured to:

receive, at the computing device of the first query system, a first query in a first query language, the first query identifying a set of data and a manner of processing the set of data, wherein the first query includes a set of commands;

process the first query to determine the set of data includes a dataset residing in a shared storage system and accessible via a second query system using a second query language that is different from the first query language;

translate the first query into a second query in the second query language by:

identifying a first query command in the first query language that has a corresponding query command in the second query language, translating the first query command in the first query language to the second query language based on the first query command, identifying a second query command in the first query for which no corresponding query command exists in the second query language, and generating a new query command in the second query language that performs functions similar to the second query command in the first query language; and communicate the second query to a search coordinator of the second query system, wherein the search coordinator executes the second query on the dataset and generates search results.

13. The computing device of claim 12, wherein the second query command in the first query language comprises a time-based query command related to organizing, sorting, and/or selecting events based on an associated time or timestamp.

14. The computing device of claim 12, wherein generating the new query command in the second query language comprises using one or more user query parameters to determine which and how many query commands or system query parameters to generate in the second query language.

15. The computing device of claim 12, wherein generating the new query command in the second query language comprises generating one or more query statements, query commands, system query parameters, lines of a query, or a combination thereof, in the second query language.

16. The computing device of claim 12, wherein the first query system and the search coordinator of the second query system are instantiated in a shared computing resource environment of a cloud service provider and are associated with a first cloud service account of the cloud service provider, wherein the dataset stored in a first location comprises a first storage system of the cloud service provider and is associated with a second cloud service account of the cloud service provider.

17. The computing device of claim 12, wherein the one or more processors are further configured to:

determining a location of the search results;

determining a quantity of the search results;

generating a plurality of results readers based on the determined quantity of the search results;

concurrently retrieving the search results from the determined location using the generated plurality of results readers;

processing the search results to determine a set of search results; and communicating the set of search results to a second computing device associated with a user.

18. The computing device of claim 17, wherein processing the search results comprises changing a format of the search results to a second format to generate the set of search results, wherein communicating the set of search results comprises communicating the set of search results in the second format.

19. The computing device of claim 17, wherein processing the search results comprises combining the search results with additional search results received from a third query system to determine the set of search results.

20. The computing device of claim 12, wherein the first query system and the search coordinator of the second query system are instantiated in a shared computing resource environment of a cloud service provider and are associated with a first cloud service account of the cloud service provider, and wherein the dataset stored in a first location comprises a portion of the shared storage system of the cloud service provider and is associated with a second cloud service account of the cloud service provider.

* * * * *